US011333511B2

(12) United States Patent
Murai

(10) Patent No.: US 11,333,511 B2
(45) Date of Patent: May 17, 2022

(54) RUNNING ROUTE DETERMINATION DEVICE, RUNNING ROUTE DETERMINATION METHOD, AND NON-TRANSITORY STORAGE MEDIUM IN WHICH PROGRAM IS STORED

(71) Applicant: TOYOTA JIDOSHA KABUSHIKI KAISHA, Toyota (JP)

(72) Inventor: Rie Murai, Chiba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 16/525,683

(22) Filed: Jul. 30, 2019

(65) Prior Publication Data

US 2020/0103240 A1    Apr. 2, 2020

(30) Foreign Application Priority Data

Oct. 2, 2018 (JP) .............................. JP2018-187519

(51) Int. Cl.
*G01C 21/34* (2006.01)
*G06Q 10/08* (2012.01)
*H04W 4/46* (2018.01)

(52) U.S. Cl.
CPC ... *G01C 21/3438* (2013.01); *G06Q 10/08355* (2013.01); *H04W 4/46* (2018.02)

(58) Field of Classification Search
CPC ...... G01C 21/3438; H04W 4/46; H04W 4/40; H04W 4/024; G06Q 10/08355; G08G 1/202
See application file for complete search history.

(56) References Cited

U.S. PATENT DOCUMENTS

2018/0275648 A1    9/2018   Ramalingam
2018/0349825 A1*  12/2018   Yamamoto ............. G06Q 50/30

FOREIGN PATENT DOCUMENTS

JP    2003-288516 A    10/2003
JP    2014-191725 A    10/2014
JP    2018-055538 A     4/2018

OTHER PUBLICATIONS

Y.-L. Chen, K.-F. Ssu and Y.-J. Chang, "Real-time Transfers for Improving Efficiency of Ridesharing Services in the Environment with Connected and Self-driving Vehicles," 2020 International Computer Symposium (ICS), 2020, pp. 165-170, doi: 10.1109/ICS51289.2020.00041. (Year: 2020).*

* cited by examiner

*Primary Examiner* — Brian P Sweeney
(74) *Attorney, Agent, or Firm* — Oliff PLC

(57) ABSTRACT

A running route determination device includes a processing unit configured to acquire first running route data for a first vehicle and second running route data for a second vehicle, search for a transfer place such that an efficiency condition is satisfied, while comparing the first running route data and the second running route data, and search for and output first modified running route data and second modified running route data. The transfer place is a place where a transport object transported by one of the first vehicle and the second vehicle transfers to the other. The first modified running route data results from modifying the first running route data such that the first vehicle goes through the transfer place, and the second modified running route data results from modifying the second running route data such that the second vehicle goes through the transfer place.

13 Claims, 14 Drawing Sheets

RUNNING ROUTE DETERMINATION DEVICE, RUNNING ROUTE DETERMINATION METHOD, AND NON-TRANSITORY STORAGE MEDIUM IN WHICH PROGRAM IS STORED

INCORPORATION BY REFERENCE

The disclosure of Japanese Patent Application No. 2018-187519 filed on Oct. 2, 2018 including the specification, drawings and abstract is incorporated herein by reference in its entirety.

BACKGROUND

1. Technical Field

The disclosure relates to a running route determination device, a running route determination method, and a non-transitory storage medium in which a program is stored.

2. Description of Related Art

For an efficient operation of a vehicle, a reduction in traffic congestion, a decrease in fuel cost and an environmental measure, a configuration in which a plurality of occupants moves with one vehicle by share ride has spread in many countries. Japanese Patent Application Publication No. 2018-55538 discloses a system that intermediates between a driver that seeks a passenger and a user that hopes to share the vehicle.

SUMMARY

Actually, there are a plurality of vehicles and a plurality of users, and there are various departure places and various destination places for the vehicles and the users. However, it is assumed that the user is transported to the destination place by one predetermined vehicle, and an efficient transport is not always realized.

The disclosure provides a technology that makes it possible to efficiently transport a transport object.

A first aspect of the disclosure is a running route determination device. The running route determination device includes a processing unit. The processing unit is configured to acquire first running route data for a first vehicle and second running route data for a second vehicle. The processing unit is configured to search for a transfer place such that an efficiency condition is satisfied, while comparing the first running route data and the second running route data, the transfer place being a place where a transport object transported by one of the first vehicle and the second vehicle transfers to the other of the first vehicle and the second vehicle. The processing unit is configured to search for and output first modified running route data and second modified running route data, the first modified running route data being data resulting from modifying the first running route data such that the first vehicle goes through the transfer place, the second modified running route data being data resulting from modifying the second running route data such that the second vehicle goes through the transfer place.

With the first aspect, it is possible to efficiently transport the transport object.

In the first aspect, the efficiency condition may be a condition that at least one of a running time and a running distance of the first vehicle is shortened. In the first aspect, the efficiency condition may be a condition that at least one of a running time and a running distance of the second vehicle is shortened.

With the above configuration, it is possible to shorten the running time or the running distance.

In the first aspect, the efficiency condition may be a condition that at least one of a time to arrival of the transport object at a destination place and a distance to the destination place is shortened.

With the above configuration, it is possible to transport the transport object in a short time and a short distance.

In the first aspect, each of the first running route data and the second running route data may include at least one of the number, size and weight of transport objects to be transported and at least one of the number, size and weight of transport objects capable of being additionally transported, and the processing unit may be configured to execute a process that searches for the first modified running route data and the second modified running route data when at least one of the number, size and weight of transport objects to transfer fits between the first running route data and the second running route data.

With the above configuration, a case where it is difficult for the transport object to transfer is removed, so that matching between the first vehicle and the second vehicle is properly performed.

In the first aspect, the processing unit may be configured to select the transfer place from commercial facilities or traffic facilities that are available at expected arrival hours of the first vehicle and the second vehicle.

With the above configuration, there is a convenience for both the transport object and a driving subject, so that a proper and smooth transfer is performed.

In the first aspect, the running route determination device may further include: a grasp unit configured to grasp each situation of three or more vehicles, from information that is received through a communication network; and a collation unit configured to select the first vehicle and the second vehicle from the three or more vehicles grasped by the grasp unit, based on a departure place and a destination place of the transport object.

With the above configuration, even when the transport object cannot go to the destination place while sharing one vehicle, the transport object can go to the destination place by making a connection between a plurality of vehicle, so that share rides to a variety of places are realized.

In the first aspect, the processing unit may be configured to, when the first vehicle and the second vehicle transport a plurality of transport objects in total, search for the transfer place such that the efficiency condition is satisfied for each transport object, and search for the first modified running route data and the second modified running route data such that efficiency is maximized.

With the above configuration, the efficiency of the transport of the transport object is further enhanced.

In the first aspect, a departure place and a destination place may be set based on the transport object, in at least one of the first running route data and the second running route data.

With the above configuration, the convenience for the transport object increases.

In the first aspect, a departure place and a destination place may be set by a first driving subject in the first running route data.

The above configuration is advantageous, because the first driving subject driving subject only needs to drive roughly in accordance with the running route data including an initial schedule of the first driving subject.

In the first aspect, a departure place and a destination place may be set by a second driving subject in the second running route data.

The above configuration is advantageous, because the second driving subject only needs to drive roughly in accordance with the running route data including an initial schedule of the driving subject.

In the first aspect, the second vehicle may be configured to send the second running route data to the first vehicle by inter-vehicle communication, the processing unit may be included in the first vehicle. The processing unit may be configured to search for the first modified running route data and the second modified running route data, and may be configured to send the second modified running route data to the second vehicle by the inter-vehicle communication.

With the above configuration, in the inter-vehicle communication, a direct data exchange is performed between the first vehicle and the second vehicle, so that a quick and simple process is realized.

In the first aspect, the first vehicle may be configured to send the first running route data to the second vehicle by inter-vehicle communication, the processing unit may be included in the second vehicle. The processing unit may be configured to search for the first modified running route data and the second modified running route data, and may be configured to send the first modified running route data to the first vehicle by the inter-vehicle communication.

With the above configuration, in the inter-vehicle communication, a direct data exchange is performed between the first vehicle and the second vehicle, so that a quick and simple process is realized.

A second aspect of the disclosure is a non-transitory storage medium in which a program is stored. The program, when the program is executed by a computer, causes the computer executing the program to execute operation including: acquiring first running route data for a first vehicle and second running route data for a second vehicle; searching for a transfer place such that an efficiency condition is satisfied, while comparing the first running route data and the second running route data, the transfer place being a place where a transport object transported by one of the first vehicle and the second vehicle transfers to the other of the first vehicle and the second vehicle; and searching for and outputting first modified running route data and second modified running route data, the first modified running route data being data resulting from modifying the first running route data such that the first vehicle goes through the transfer place, the second modified running route data being data resulting from modifying the second running route data such that the second vehicle goes through the transfer place.

A third aspect of the disclosure is a running route determination method. The running route determination method includes: acquiring first running route data for a first vehicle and second running route data for a second vehicle; searching for a transfer place such that an efficiency condition read from a storage unit is satisfied, while comparing the first running route data and the second running route data, the transfer place being a place where a transport object transported by one of the first vehicle and the second vehicle transfers to the other of the first vehicle and the second vehicle; and searching for and outputting first modified running route data and second modified running route data, the first modified running route data being data resulting from modifying the first running route data such that the first vehicle goes through the transfer place, the second modified running route data being data resulting from modifying the second running route data such that the second vehicle goes through the transfer place.

Each of the first aspect, second aspect and third aspect of the disclosure searches for the transfer place where the transport object transported by one of the first vehicle and the second vehicle transfers to the other of the first vehicle and the second vehicle, such that the efficiency condition is satisfied, while comparing the first running route data for the first vehicle and the second running route data for the second vehicle, and searches for and outputs the first modified running route data and second modified running route data resulting from modifying the first running route data and the second running route data such that the first vehicle and the second vehicle go through the transfer place. With the first aspect, second aspect and third aspect of the disclosure, the transport object can transfer at a suitable transfer place. Thereby, the transfer of the transport object is realized, and the transport object can be efficiently transported.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described in detail, based on the drawings. The disclosure is not limited to the embodiment.

Figure 1:
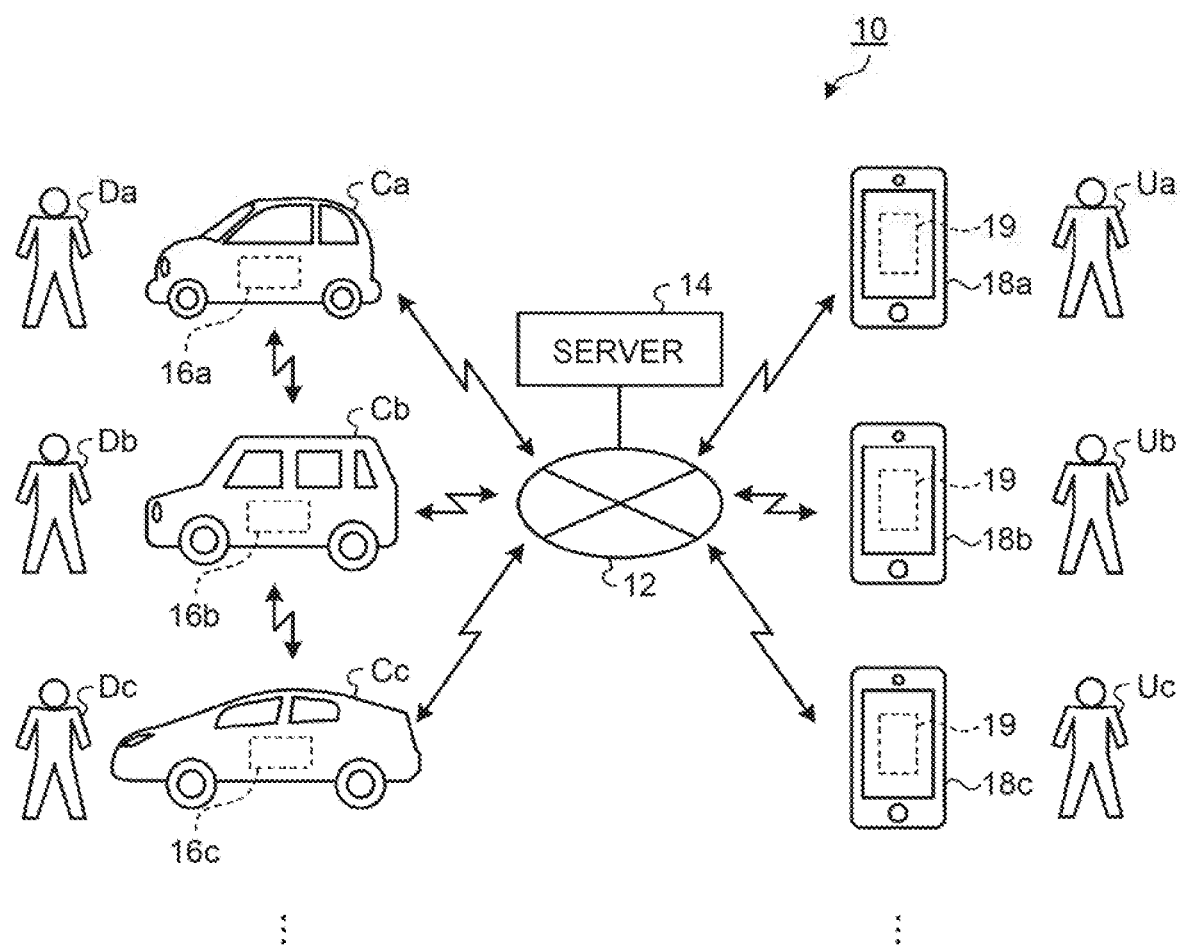
FIG. 1 is a block diagram of a share-ride support system including a navigation device and a server according to an embodiment.

FIG. 1 is a schematic block diagram of a share-ride support system 10 to which the embodiment is applied. An example of a running route determination device in the disclosure is a later-described server 14 or navigation device 16 in the embodiment. An example of a program in the disclosure is a later-described program 30 or program 66 in the embodiment. For example, a running route determination method in the disclosure is executed by the server 14 or navigation device 16 in the embodiment, or is executed when the program 30 or program 66 is read by a computer.

The share-ride support system 10 is managed by the server 14 connected to a communication network 12 such as the internet, and is used by drivers (driving subjects) Da, Db, Dc, . . . (also collectively referred to as a driver D) and users Ua, Ub, Uc, . . . (also collectively referred to as a user U). The driver D and the user U are previously registered in the server 14. However, the share-ride support system 10 may be configured such that a non-registered person can use the share-ride support system 10 depending on a condition.

The drivers Da, Db, Dc, . . . drive vehicles Ca, Cb, Cc, . . . (also collectively referred to as a vehicle C), and are registered together with the vehicles Ca, Cb, Cc, . . . , in the server 14. The vehicles Ca, Cb, Cc, . . . include navigation devices 16a, 16b, 16c, . . . (also collectively referred to as a navigation device 16). The vehicle C is operated by the driver D, based on running route data R that is held by the navigation device 16. The running route data R, which has a broad sense, may indicate a free traveling state with no destination place, or may include time information or information relevant to the user U to share the vehicle and user's baggage.

The navigation device 16 can mutually communicate with the server 14 through the communication network 12, and furthermore, two or more vehicles C can mutually perform inter-vehicle communication. Thereby, the navigation device 16 can send the running route data R or the like to the server 14 or the vehicle C as a partner. Bending arrows in FIG. 1 indicate wireless communication routes.

The users (transport objects) Ua, Ub, Uc, . . . carry mobile terminals 18a, 18b, 18c, . . . (also collectively referred to as a mobile terminal 18) such as smartphones. For the use of the share-ride support system 10, the user U previously performs a predetermined registration, and downloads an application 19 for the use to the mobile terminal 18. With the application 19, the mobile terminal 18 can access the server 14 through the communication network 12.

The share-ride support system 10, schematically, is a system that intermediates between the driver D and the user U after the user U sends a use request for ride with the mobile terminal 18 and the server 14 searches for the vehicle C fitting with the condition, and further supports a transfer of the user U among two or more vehicles C at a transfer place Z in the middle of the route, in consideration of an efficiency condition. The determination about the transfer of the user U is sometimes performed among the vehicles C without the server 14.

In the following description, for avoiding complication and facilitating understanding, a process that is performed by the driver D or the navigation device 16 may be also referred to as a process by the vehicle C, and a process that is performed by the user U with the mobile terminal 18 may be also referred to as merely a process by the user U. Further, a vehicle C that is a processing subject at the time point of the description may be also referred to as an own vehicle C. Furthermore, another vehicle C to which the user U transfers from the own vehicle C, or another vehicle C that is a candidate for the transfer may be also referred to as a transfer vehicle C'.

Figure 2:
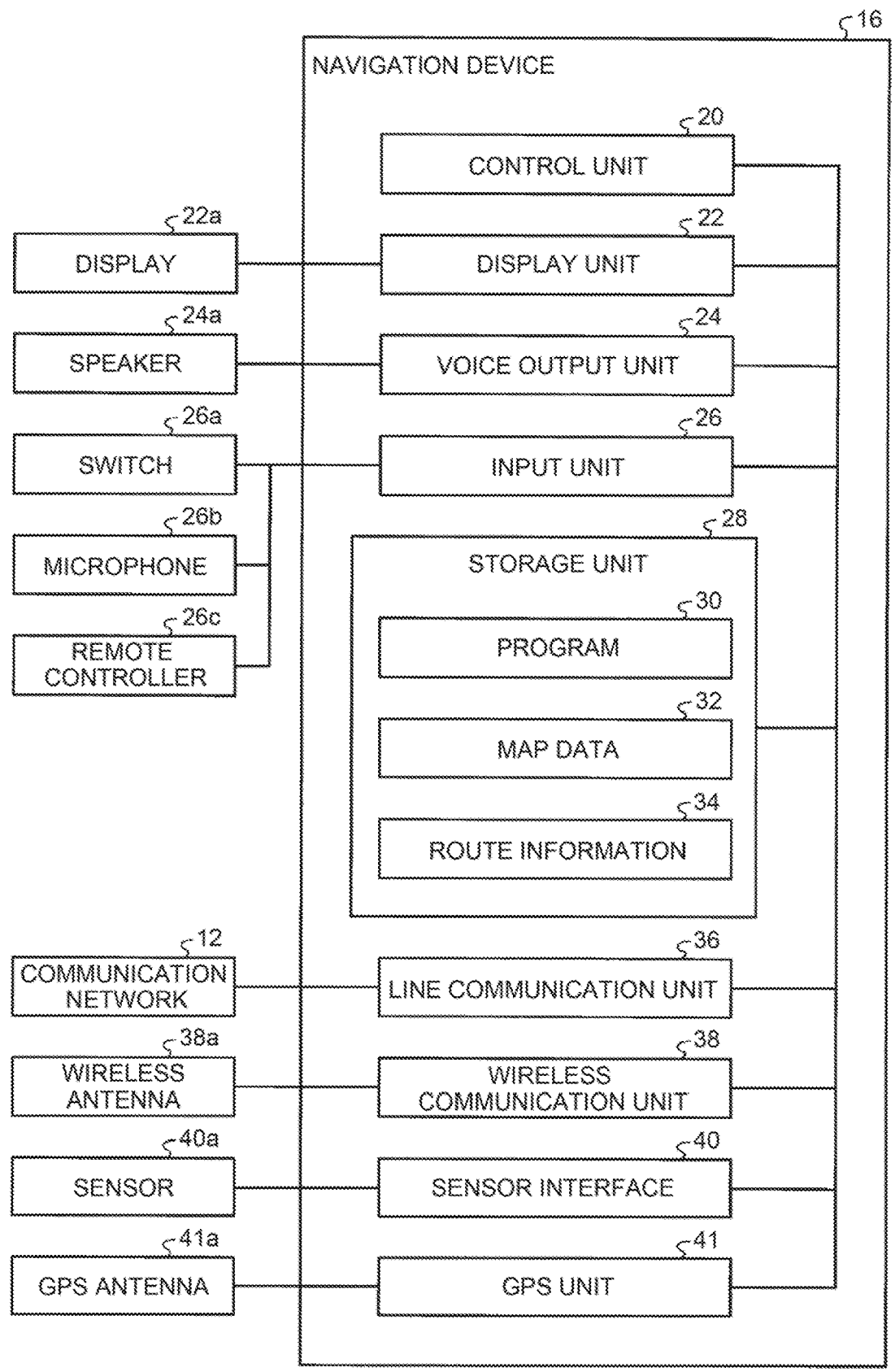
FIG. 2 is a block diagram of the navigation device according to the embodiment.

As shown in FIG. 2, the navigation device 16 includes a control unit 20 that manages and controls the whole of the navigation device 16, a display unit 22 that displays an image or a character on a display 22a, a voice output unit 24 that outputs a voice from a speaker 24a, an input unit 26 that accepts an input from a switch 26a, a microphone 26b or a remote controller 26c, and a storage unit 28.

For example, the control unit 20 and a later-described control unit 60 may be realized when a program is executed by a processing device such as a central processing unit (CPU), that is, may be realized by software, may be realized by hardware such as an integrated circuit (IC), or may be realized by both software and hardware.

In the storage unit 28, there is stored a program 30 to be read and executed by the control unit 20, a map data 32 and route information 34. The map data 32 includes road information, intersection information, facility information and the like that are necessary to navigate the vehicle C. The storage unit 28 is rewritable. For example, the program 30 and the map data 32 are loaded from an external storage medium through a predetermined input-output port, or are loaded from the server 14 or the like through the communication network 12. The route information 34 includes the running route data R for traveling of the vehicle C and modified running route data R' resulting from modifying the running route data R.

The navigation device 16 further includes a line communication unit 36 connected to the communication network 12, a wireless communication unit 38 that performs the inter-vehicle communication through a wireless antenna 38a, a sensor interface 40 that processes an input signal of a sensor 40a, and a global positioning system (GPS) unit 41 connected to a GPS antenna 41a.

The line communication unit 36 can mutually access the server 14 and the like through the communication network 12. The wireless communication unit 38, which is used for the inter-vehicle communication, sends and receives data such as position, direction and speed, for another vehicle C, at short intervals. When there is a possibility of collision, a warning is given to the partner, and a measure such as an automatic braking is taken in the case of an automatic driving vehicle. As the standard of the inter-vehicle communication, for example, dedicated short range communications (DSRC) is used. The inter-vehicle communication is not limited to a direct wireless communication between the vehicles C in a short range, and may be a communication through the communication network 12 or other mediational means. Further, the inter-vehicle communication is not limited to IoT communication. The sensor 40a includes a speed sensor, an acceleration sensor, a gyroscope sensor and the like, and is used for detecting the current place and behavior of the vehicle C. The GPS unit 41 can acquire the current place of the vehicle C, through an electric wave that is sent from an artificial satellite.

Constituent elements of the navigation device 16 are mutually connected by a bus. Further, constituent elements of the navigation device 16 do not always need to form one unit, and for example, some constituent elements may be included in another computer unit. The navigation device 16 is not always limited to in-vehicle types, and for example, a mobile terminal carried by the driver D may be used as the navigation device 16. The computer may be constituted by only the navigation device 16, or may be constituted by a combination of the navigation device 16 and another computer unit.

Figure 3:
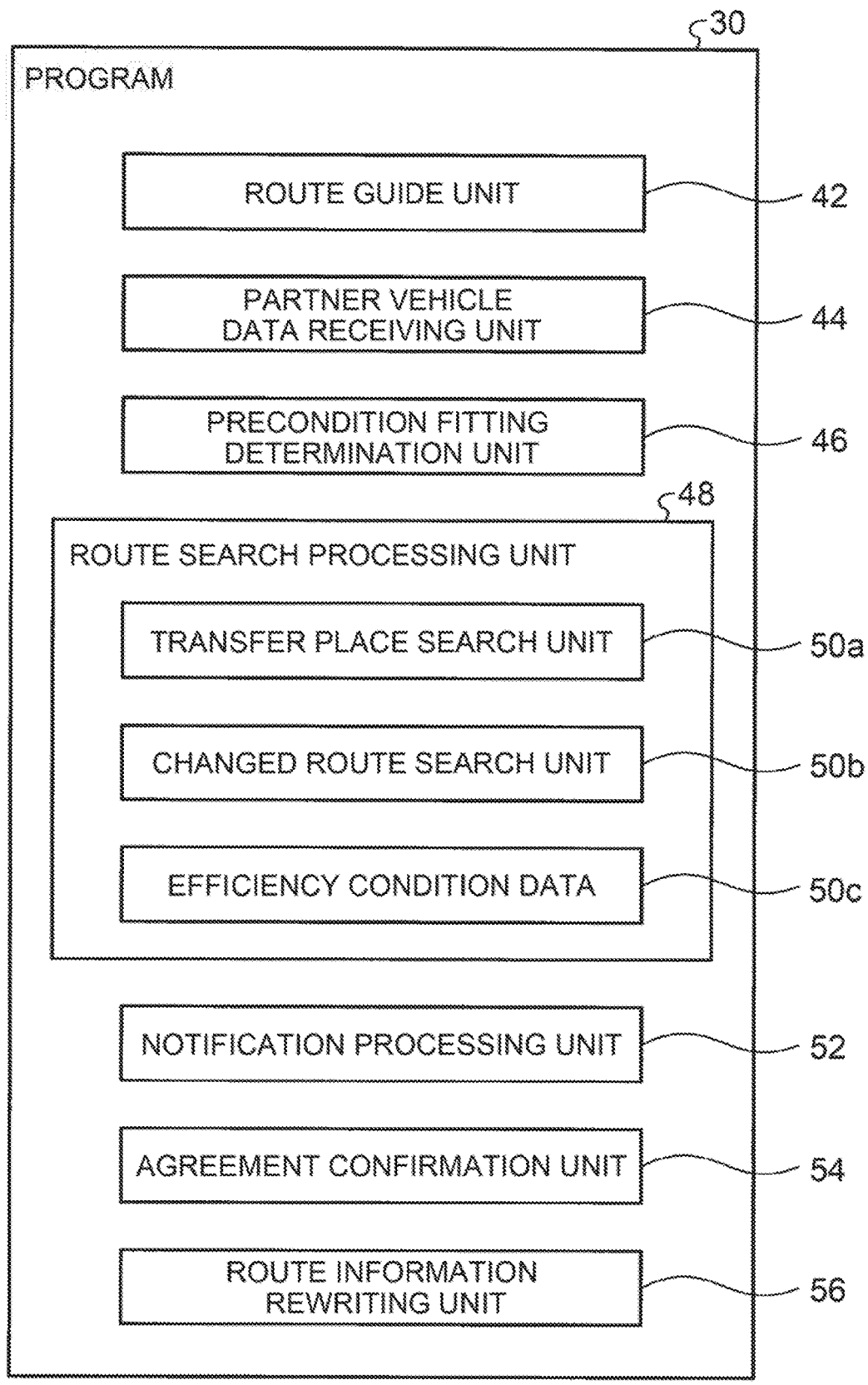
FIG. 3 is a diagram showing a configuration of a program according to the embodiment.

As shown in FIG. 3, the program 30 includes a route guide unit 42, a partner vehicle data receiving unit 44, a precondition fitting determination unit 46, a route search processing unit 48, a notification processing unit 52, an agreement confirmation unit 54, and a route information rewriting unit 56.

The control unit 20 is configured to read the route guide unit 42 and execute a route guide for the driver D based on the route information 34 and the current place of the vehicle C. The control unit 20 is configured to execute the route guide using the display 22a and the speaker 24a. The control unit 20 is configured to read the partner vehicle data receiving unit 44, and to receive a variety of data about the vehicle C as the partner by the inter-vehicle communication. The data includes information about a route on which the vehicle C is traveling, the number of users U that are transported, the size and weight of baggage of the users U, the destination of the user U, the destination of the driver D, and the like.

The control unit 20 is configured to read the precondition fitting determination unit 46, and to determine whether basic matters such as the number of persons capable of riding and the size of the baggage fit with the vehicle C as the partner, when the user U rides or transfers. When there is a fitting vehicle C, the control unit 20 is configured to adopt the vehicle C as a candidate of the transfer vehicle C'.

When the driver D inputs a destination, the control unit 20 reads the route search processing unit 48, searches for a suitable route from the current place to the destination, as the running route data R, and displays the running route data R on the display 22a. In the route search, as necessary, it is possible to designate a passing place. The obtained running route data R is stored as the route information 34. The control unit 20 refers to the running route data R by reading the route guide unit 42, and to guide the driver D. When the vehicle C is traveling on a different route from the running route data R, the control unit 20 reads the route search processing unit 48, automatically re-executes the route search, if appropriate, based on the current place, and rewrites the running route data R. The running route data R includes an expected arrival hour for the destination place and an expected running time.

The route search processing unit 48, as additional function units, includes a transfer place search unit 50a and a changed route search unit 50b, and further includes efficiency condition data 50c to which the transfer place search unit 50a and the changed route search unit 50b refer.

The control unit 20 is configured to read the transfer place search unit 50a, and to search for an appropriate transfer place Z when one or more users U transfer between the own vehicle C and the transfer vehicle C'. Based on the route information 34 about the own vehicle C and the route information 34 about the transfer vehicle C' (that is, the running route data R1 and the running route data R2), the transfer place Z is selected in a range close to the route, such that an arrival hour difference between the own vehicle C and the transfer vehicle C' is smaller than a condition value. The transfer place Z is selected from commercial facilities (large stores, small stores, restaurants, and the like), traffic facilities (service areas, parking areas, expressway bus stops, roadside stations, station rotaries, gas stations, and the like) that are available at expected arrival hours of the own vehicle C and the transfer vehicle C'. The traffic facility includes a boarding facility dedicated for share-ride vehicles. Further, as the transfer place Z, it is preferable to be a place where there are moderate parking spaces, a bench, a roof and a toilet, and further, it is preferable to be a place where there is a light during the night. Facilities that are candidates of the transfer place Z are stored in the map data 32. When such a facility is selected as the transfer place Z, there is a convenience for both the user U and the driver D, so that a proper and smooth transfer is performed. Particularly, such a facility is convenient for the user U to transfer, when there is some wait time.

The control unit 20 is configured to read the changed route search unit 50b, and to search for routes including the transfer place Z, for the route information 34 about the own vehicle C and the route information 34 about the transfer vehicle C'.

The control unit 20 reads the transfer place search unit 50a, the changed route search unit 50b and the efficiency condition data 50c, and performs a process so as to satisfy a condition specified in the efficiency condition data 50c. In the efficiency condition data 50c, some conditions are specified. One of the conditions is a condition that at least one of a running time and a running distance of the own vehicle C is shortened. Further, another of the conditions is a condition that at least one of a running time and a running distance of the transfer vehicle C' is shortened. Further, another of the conditions is a condition that at least one of a time to arrival of the user U at the destination place and a distance to the destination place is shortened. In the determination of the time, congestion information or accident information may be considered. Further, another of the conditions is a condition that a running cost (for example, a fuel cost and a road toll) of the own vehicle C is reduced. Further, another of the conditions is a condition that a running cost (for example, a fuel cost and a road toll) of the transfer vehicle C' is reduced. Further, another of the conditions is a condition that the total of the running costs (for example, fuel costs and road tolls) of the own vehicle C and the transfer vehicle C' is reduced. Further, another of the conditions is a condition that an environment load to be calculated from the fuel consumption, fuel efficiency and running distance of the vehicle C is reduced. In the efficiency condition data 50c, another efficiency condition may be further specified. From the efficiency conditions, depending on the situation, one condition is selected, or a plurality of conditions is weighted and used.

In the search for the transfer place Z and the route that is executed when the control unit 20 reads the transfer place search unit 50a and the changed route search unit 50b, the determination whether the efficiency condition specified in the efficiency condition data 50c is satisfied is executed based on a predetermined threshold. In the case where no search result satisfies the threshold, the transfer of the user U is not performed. In the case where a plurality of search results satisfies the threshold, a search result having the highest score is selected. The control unit 20 may integrally execute processes in which the control unit 20 reads and executes the transfer place search unit 50a and the changed route search unit 50b.

Figure 4:
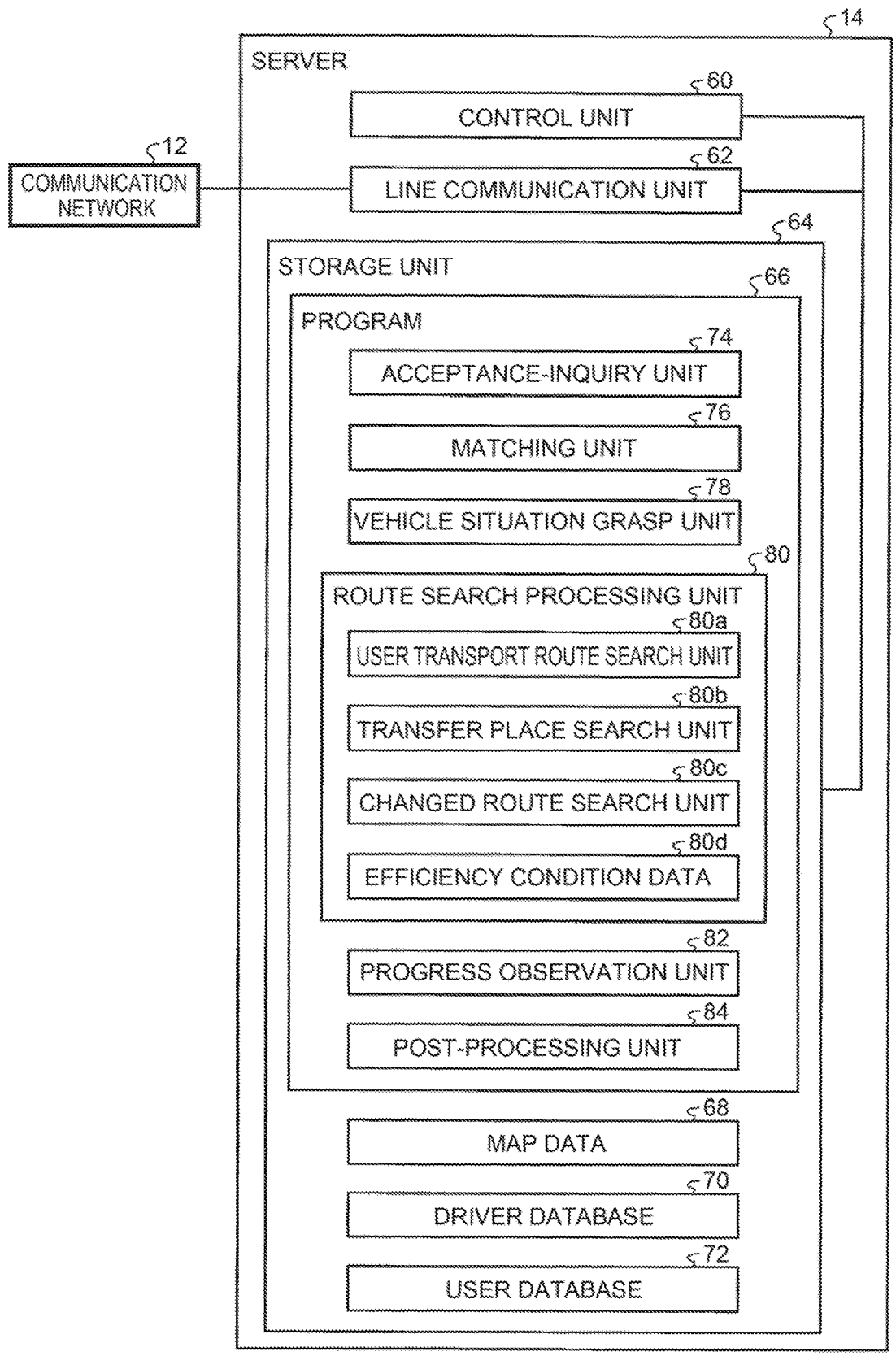
FIG. 4 is a block diagram of the server according to the embodiment.

As shown in FIG. 4, the server 14 includes a control unit 60, a line communication unit 62 and a storage unit 64.

In the storage unit 64, a program 66, map data 68, a driver database 70 and a user database 72 are stored. The storage unit 64 is rewritable. The control unit 60 reads and executes the program 66. The line communication unit 62 can mutually access the navigation device 16, the mobile terminal 18 and the like through the communication network 12.

The map data 68 is the same as the above map data 32, but may be more detailed map data than the map data 32, depending on the remaining storage capacity. In the driver database 70, which is a database about the registered driver D, name, sexuality, age, evaluation, contact address, the vehicle C to be driven, routes having high running frequencies, and the like are stored together with identification number. Among them, the evaluation is made by the user U transported in the past. The routes having high running frequencies are rewritten if appropriate, based on the determination from the past data by the server 14. In the user database 72, which is a database about the registered user U, name, sexuality, age, evaluation, routes having high use frequencies, and the like are stored together with identification number. Among them, the evaluation is made by the driver D of the vehicle C used in the past. The routes having high use frequencies are rewritten if appropriate, based on the determination from the past data by the server 14.

The program 66 includes an acceptance-inquiry unit 74, a matching unit 76, a route search processing unit 80, a vehicle situation grasp unit 78, a progress observation unit 82 and a post-processing unit 84. The control unit 60 is configured to read the acceptance-inquiry unit 74, to accept the use request from the user U, and to make an inquiry to the vehicle C about whether the vehicle C agrees to the use request. The control unit 60 is configured to read the matching unit 76, to search for vehicles C that fit with a hope of the user U, from the plurality of vehicles C, and to combine the user U and one of the vehicles C.

The vehicle situation grasp unit 78 includes the current place, the running route data R, the destination place, and hour information (the expected arrival hour and the like) for each vehicle C. The information to be included in the vehicle situation grasp unit 78 is periodically sent from the navigation device 16 of each vehicle C through the communication network 12, and is acquired by the server 14. Further, the vehicle situation grasp unit 78 is configured to store also a running schedule before departure for each vehicle C. The control unit 60 is configured to read the vehicle situation grasp unit 78, and to grasp situations of the plurality of the registered vehicles C.

The route search processing unit 80 has the same function as the route search processing unit 48 of the navigation device 16. A transfer place search unit 80b, a changed route search unit 80c and an efficiency condition data 80d correspond to the transfer place search unit 50a, the changed route search unit 50b and the efficiency condition data 50c, respectively. The route search processing unit 80 further includes a user transport route search unit 80a.

The control unit 60 is configured to read the user transport route search unit 80a, and to search for a route appropriate for the vehicle C to transport the user U to the destination place, while referring to the map data 68, based on a desired departure time (for example, after five minutes), a departure place (for example, the current place) and a destination place of the user U having performed the use request and the current place, a destination place, a route and an expected position at the above desired departure time of the vehicle C in which the user U rides.

The control unit 60 is configured to read the progress observation unit 82, and to grasp the situations of the user U and the vehicle C after the combination of the user U and the vehicle C is decided and the user U gets in the vehicle C to be transported and before the user U arrives at the destination place and gets out of the vehicle C. The progress observation unit 82 may be included in the vehicle situation grasp unit 78. The control unit 60 is configured to read the post-processing unit 84, and to perform a necessary post-process after the vehicle C finishes the transport of the user U.

The control unit 60, line communication unit 62 and storage unit 64 of the server 14 do not always need to form one unit, and for example, the storage unit 64 may be at a remote place that is connected through the communication network 12. The computer may be constituted by only the server 14, or may be constituted by a combination of the server 14 and another computer unit. The location where the server 14 and the program 66 exist is not limited to a country in which the vehicle C runs. A case where the server 14 and the program 66 exist in another country is substantially the same as a case where the server 14 and the program 66 are installed and used in the country in which the vehicle C runs, if the server 14 and the program 66 can be controlled from the country in which the vehicle C runs and some benefit can be enjoyed in the country in which the vehicle C runs. Further, as hardware of the server 14, general-purpose products can be used, and detailed descriptions of the hardware are omitted.

Figure 5:
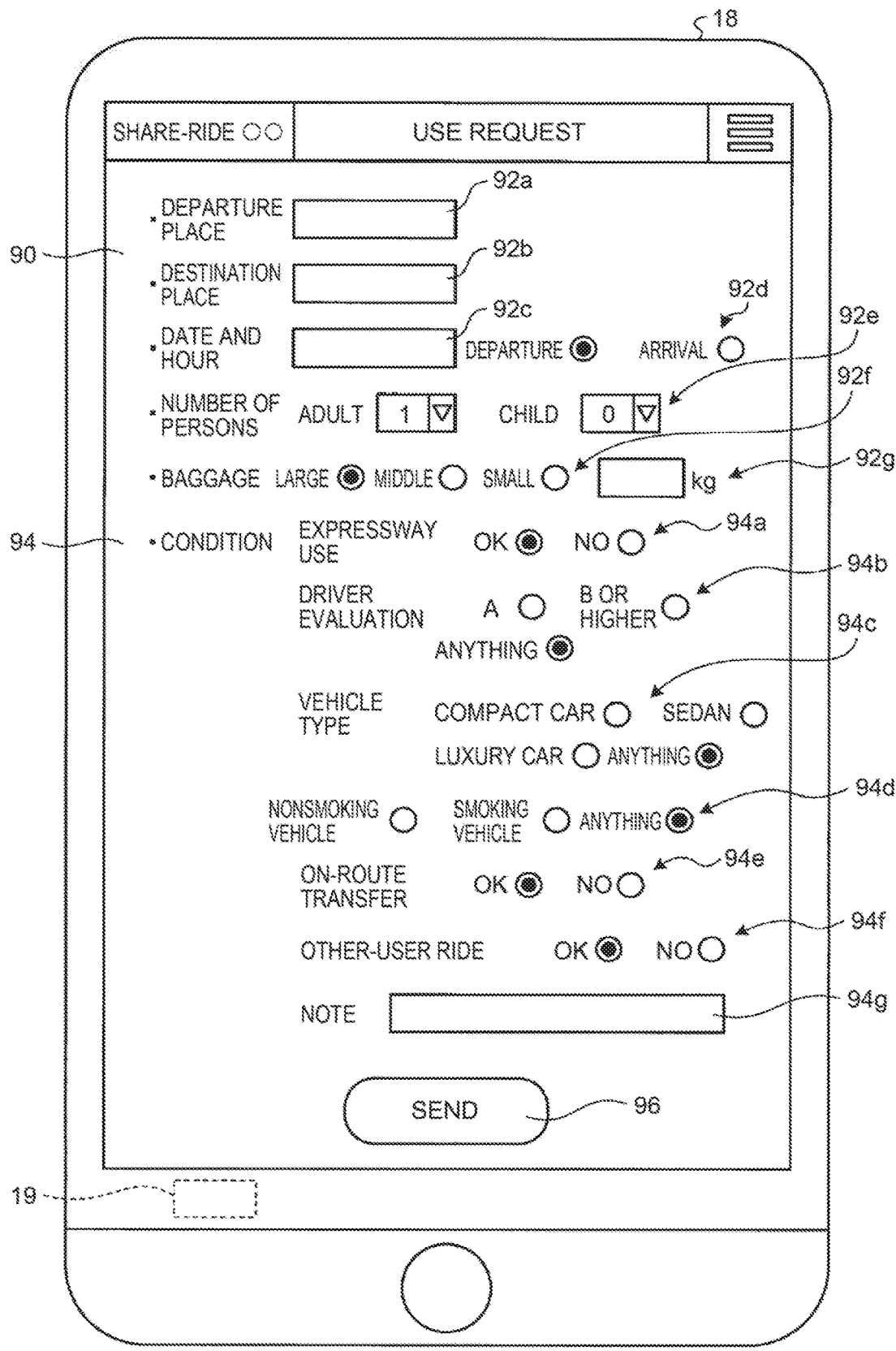
FIG. 5 is a diagram showing a use request screen that is displayed on a mobile terminal.

As shown in FIG. 5, on the mobile terminal 18, a use request screen 90 is displayed by the application 19. The use request screen 90 is a screen that is used when the user U performs the use request for the share-ride support system 10. On the use request screen 90, there are provided a departure place input box 92a, a destination place input box 92b, a date-and-hour input box 92c, a departure-arrival selection radio button 92d, a person-number selection input box 92e, a baggage class radio button 92f and a baggage weight input box 92g, as input parts for basic matters. The departure place input box 92a and the destination place input box 92b are parts to which the user U inputs a desired departure place and destination place for transport. The user U can input an address, a telephone number, a postal number, a famous facility name or the like, can designate a point on a map, or can select the departure place and the destination place from logs. The user U may designate the current place as the departure place, based on a current place acquisition function of the mobile terminal 18. The date-and-hour input box 92c is a part to which the user U inputs a desired date and hour. The date and hour of the departure or the date and hour of the arrival is selected through the departure-arrival selection radio button 92d.

The person-number selection input box 92e is a part to which the user U inputs the number of persons that hopes to ride for each of adult and child. The baggage class radio button 92f is a part to which the user U inputs the size of the baggage by selecting one from some classes, and for example, the user U selects one from large, small and nothing. The baggage weight input box 92g is a part to which the user U inputs the weight of the baggage. When the baggage plainly has a weight lighter than a predetermined weight, the user U does not need to input the weight of the baggage.

On the use request screen 90, a condition input part 94 is further provided. The condition input part 94 is a part to which the user U inputs a user's demand, and when there is no particular demand, the user U keeps a default. On the condition input part 94, there are provided an expressway use radio button 94a, a driver evaluation radio button 94b, a vehicle type selection radio button 94c, a smoking-nonsmoking radio button 94d, an on-route transfer radio button 94e, an other-user ride radio button 94f and a note box 94g.

The user U selects whether to use an expressway through the expressway use radio button 94a. The user U selects a desired evaluation rank of the driver D through the driver evaluation radio button 94b. The user U selects a desired vehicle type through the vehicle type selection radio button 94c. The user U selects a nonsmoking vehicle or a smoking vehicle through the smoking-nonsmoking radio button 94d. The user U selects whether to allow an on-route transfer for the vehicle C depending on the situation, through the on-route transfer radio button 94e. The user U selects whether to allow another user U to share the vehicle on a part or a whole of the transport route, through the other-user ride radio button 94f. The user U, if necessary, writes another demand in the note box 94g.

After inputting the above, the user U taps a sending button 96, so that the input information is sent to the server 14. In the server 14 (see FIG. 4), the acceptance-inquiry unit 74 accepts information relevant to the request from the user U, and the control unit 60 reads the matching unit 76. Then, by reading the vehicle situation grasp unit 78, the control unit 60 selects some candidates that fit with the condition, based on the grasped situations of the vehicles C. The candidates is selected, for example, from vehicles C that are close to the current place or departure place of the user U, or vehicles C that are scheduled to travel on routes roughly containing the current place or departure place of the user U. Further, as necessary, the control unit 60 performs narrowing-down while referring to the information about the driver D and the user U from the driver database 70 and the user database 72.

Figure 6:
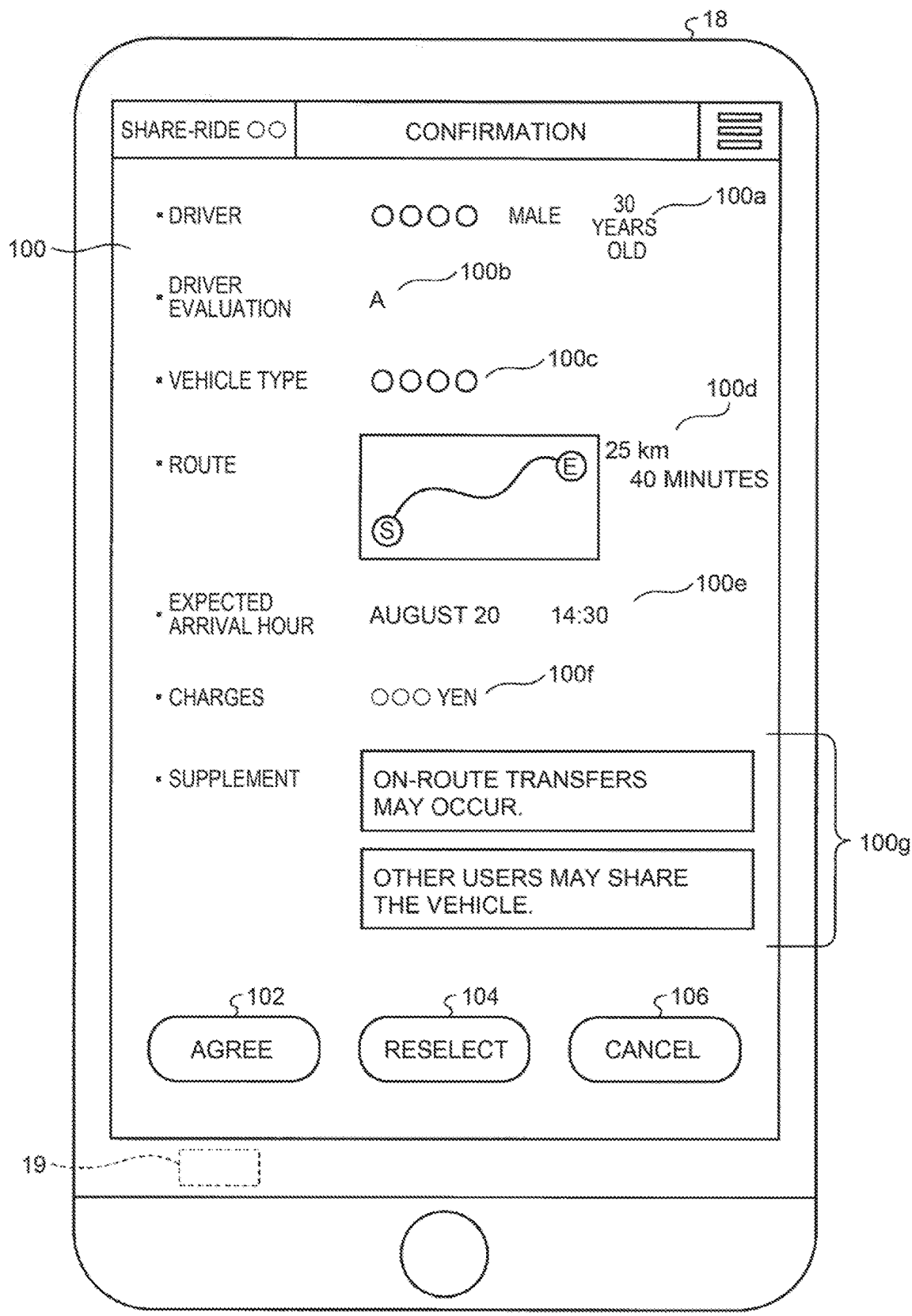
FIG. 6 is a diagram showing a confirmation screen that is displayed on the mobile terminal.

Then, the control unit 60 reads the user transport route search unit 80a, and searches for a route when the user U is transported by the vehicle C that is a candidate. When an appropriate route is found, the control unit 60 reads the acceptance-inquiry unit 74, and makes an inquiry to the vehicle about whether the vehicle C can transport the user U. At this time, to the vehicle C, the control unit 60 sends also the information about the found route and the information about the user U that is stored in the user database 72. When the control unit 60 receives a signal indicating agreement from the vehicle C, the control unit 60 reads the acceptance-inquiry unit 74, and sends the information relevant to the vehicle C and the driver D, and the information about the found route, to the mobile terminal 18 of the user U. In response to this, on the mobile terminal 18, a confirmation screen 100 shown in FIG. 6 is displayed by action of the application 19. Further, when the server 14 cannot find any appropriate vehicle C, the server 14 sends that result to the mobile terminal 18, to notify the user U.

As shown in FIG. 6, on the confirmation screen 100, there are provided a driver information display part 100a, a driver evaluation display part 100b, a vehicle type display part 100c, an hour display part 100e, a charge display part 100f and a supplement display part 100g. The driver information display part 100a is a part that displays the name, sexuality, age and the like of the driver D of the selected vehicle C. The driver evaluation display part 100b is a part that displays the evaluation rank of the driver D. The vehicle type display part 100c is a part that displays the vehicle type of the selected vehicle C. The route display part 100d is a part that shows the route found by the server 14, on a map, and that displays the distance and an expected travel time. The hour display part 100e is a part that displays the expected arrival hour for the destination place. The charge display part 100f is a part that displays charges to be paid by the user U. In the charge payment, for example, an automatic transaction such as credit-card payment can be used. Naturally, charges to be paid by the user U, and rewards that are acquired by the driver D and an operator of the share-ride support system 10 based on the charges comply with the law in the country or region. The supplement display part 100g is a part that displays supplements, and for example, displays a supplement "On-route transfers may occur" and a supplement "Other users may share the vehicle".

The user U confirms these conditions, and then, when the user U agrees, the user U taps an agreement button 102. Thereby, a share-ride contract is completed. When the displayed conditions do not fit with the desired conditions and the user U desires another driver D, the user D taps a reselection button 104, and requests a reselection to the server 14. When the displayed conditions do not fit with the desired conditions and the user U cancels the use request, the user taps a cancel button 106. The mobile terminal 18 can be applied when the application 19 is loaded on a general-purpose product, and therefore, detailed descriptions of hardware of the mobile terminal 18 are omitted.

Next, a first running route determination example to a fourth running route determination example in the share-ride support system 10 configured in this way will be described with reference to FIG. 7 to FIG. 14. In the following examples, it is assumed that each user U agrees to the on-route transfer and sharing the vehicle with other users U. In the following examples, for facilitating understanding, step numbers are assigned roughly in order of time, without discriminating execution subjects. First, the first running route determination example will be described with reference to FIG. 7 and FIG. 8.

First Running Route Determination Example

Figure 7:
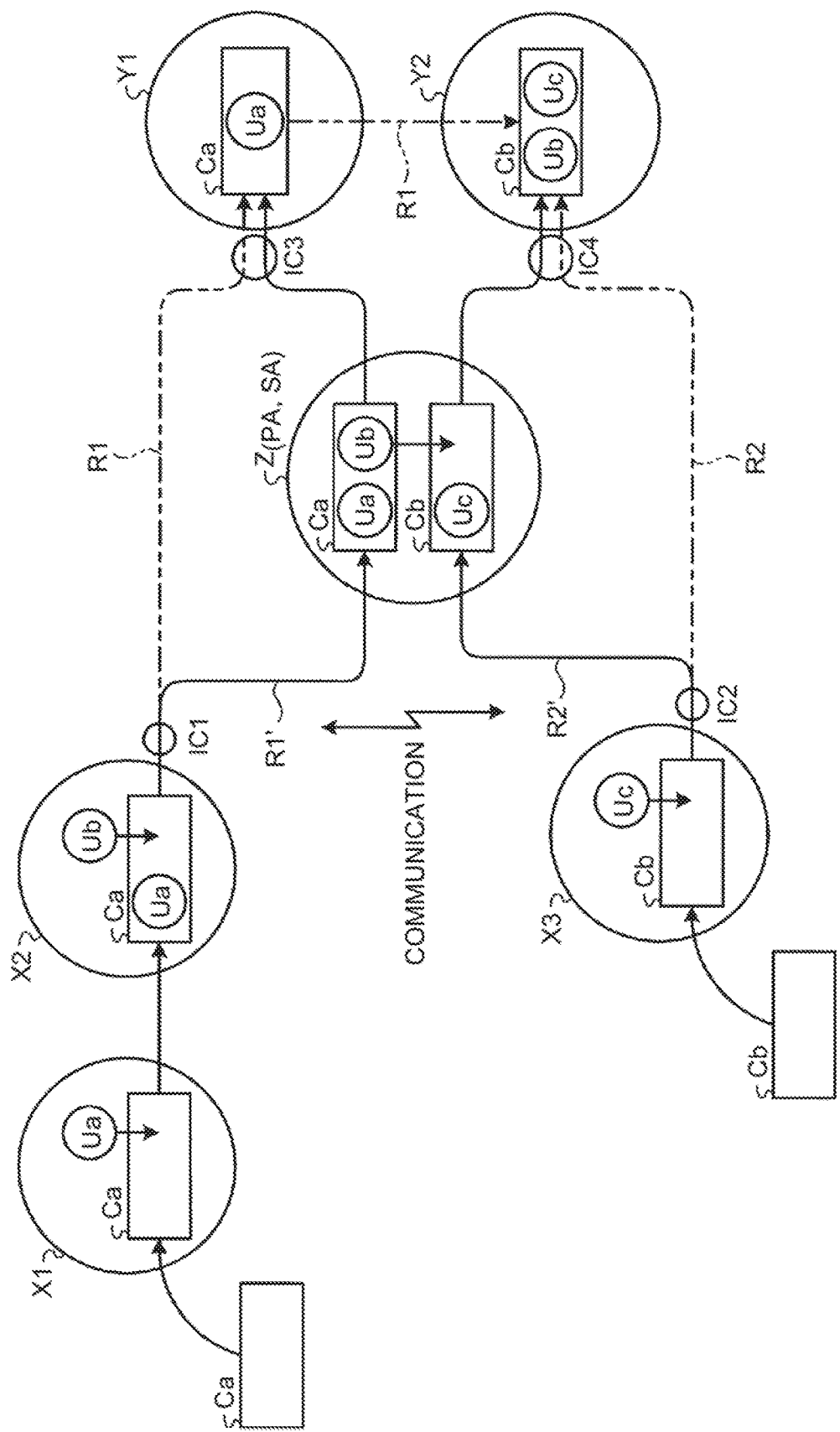
FIG. 7 is a schematic diagram showing vehicles, users, departure places, a transfer place and destination places in a first running route determination example.

As shown in FIG. 7, in the first running route determination example, a user Ua goes from a departure place X1 to a destination place Y1, a user Ub goes from a departure place X2 to a destination place Y2, and a user Uc goes from a departure X3 to the destination place Y2. The departure place X1 and the departure place X2 are close to each other. The departure place X1 and the departure place X2 are close to an interchange IC1, and the departure place X3 is close to an interchange IC2. The destination place Y1 is close to an interchange IC3. The destination place Y2 is slightly close to the destination place Y1 although the destination place Y2 is not sufficiently close to the destination place Y1, and is closer to an interchange IC4 than the destination place Y1 is. The interchange IC3 and the interchange IC4 are adjacent to each other. A vehicle Ca is close to the departure place X1, and a vehicle Cb is close to the departure place X3. The destination place Y2 of the user Ub and the destination place Y2 of the user Uc do not need to exactly coincide with each other.

Figure 8:
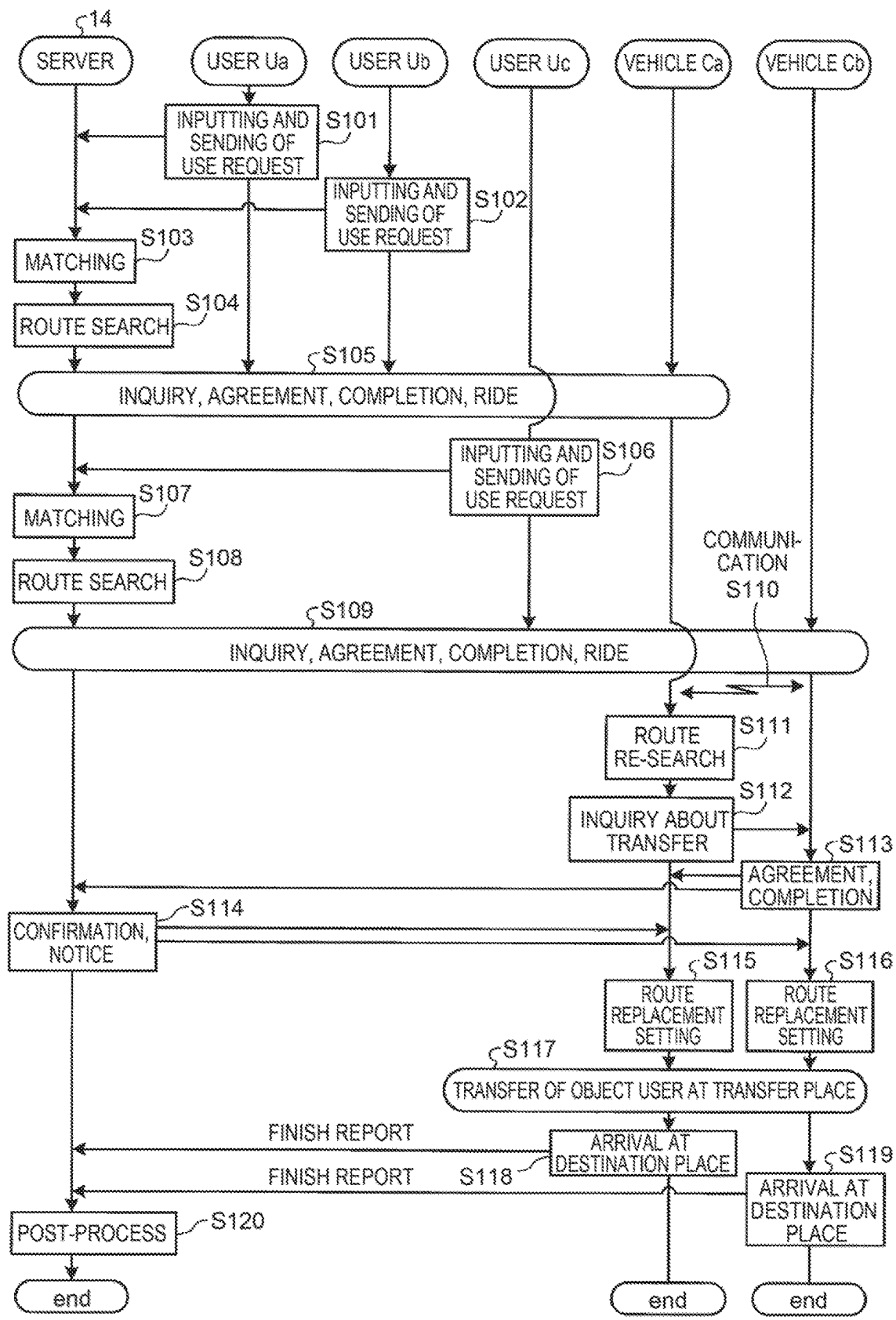
FIG. 8 is a flowchart in the first running route determination example.

As shown in FIG. 8, first, in step S101, the user Ua inputs and sends the request for the share ride. Similarly, in step S102, the user Ub inputs and sends the request for the share ride. The inputting and the sending are performed to the server 14 using the use request screen 90 in FIG. 5, immediately before the use or in advance.

In step S103, the server 14 performs the matching between the user U and the vehicle C. In this case, since the departure place X1 and the departure place X2 are close to each other and the destination place Y1 and the destination place Y2 are slightly close to each other, the server 14 determines that it is efficient that the vehicle Ca close to the departure place X1, alone, transports the two users Ua, Ub. This process is performed when the control unit 60 reads the matching unit 76 (see FIG. 4).

Furthermore, in step S104, the server 14 searches for the running route data R1 with which the vehicle Ca transports the users Ua, Ub from the departure places X1, X2 to the destination places Y1, Y2. In this case, for the running route data R1, the server 14 determines that it is appropriate that the vehicle Ca first goes to the departure place X1 to cause the user Ua to get in, further goes to the departure place X2 to cause the user Ub to get in, uses an expressway from the interchange IC1 to the interchange IC3, causes the user Ua to get out at the destination place Y1, and finally causes the user Ub to get out at the destination place Y2, and searches for the route. The running route data R1 as the search result includes the expected arrival hours for the departure places X1, X2 and the destination places Y1, Y2. The running route data R1 may further include expected passing hours for on-route points, for example, the interchanges IC1, IC3. The processes are performed when the control unit 60 reads the user transport route search unit 80a (see FIG. 4). The process of the matching unit 76 and the process of the user transport route search unit 80a are repeatedly executed multiple times, while the matching unit 76 and the user transport route search unit 80a mutually refer to the processing results. The process of the matching unit 76 and the process of the user transport route search unit 80a may be executed in parallel.

In step S105, the server 14, for the users Ua, Ub, sends the information of the running route data R1 and the information about the vehicle Ca, to the mobile terminals 18, displays the confirmation screen 100 in FIG. 6, and makes inquiries about whether the users Ua, Ub agree. Based on the displayed information, the users Ua, Ub send information of agreement or disagreement, to the server 14. Meanwhile, the server 14 sends the information of the running route data R1 and the information about the users Ua, Ub to the vehicle Ca, to display the information on the display 22a, and makes an inquiry about whether the driver Da agrees. Based on the displayed information, the driver Da sends information of agreement or disagreement, to the server 14. When the three persons agree, the contract is completed, and the server 14 returns the information of the contract completion, to the three persons. On that occasion, the server 14 notifies the driver Da of the contact addresses of the users Ua, Ub, and notifies the users Ua, Ub of the contact address of the driver Da. After the completion of the contract, the vehicle Ca causes the users Ua, Ub to get in at the departure places X1, X2, and goes to the first destination place Y1, in accordance with the running route data R1. As the procedure and order of the inquiry and the agreement or disagreement, various modes can be adopted.

Thereafter, in step S106, the user Uc inputs and sends the request for the share ride. In step S107 and step S108, the server 14 performs the matching and the route search, similarly to step S103 and step S104 described above. In this case, the server 14 determines that it is appropriate that the vehicle Cb close to the departure place X3 transports the user Uc. Further, for the running route data R2, the server 14 determines that it is appropriate that the vehicle Cb first goes to the departure place X3 to cause the user Uc to get in, uses the expressway from the interchange IC2, passes through the interchange IC3, exits the expressway at the next interchange IC4, and causes the user Uc to get out at the destination place Y2, and searches for the route. The running route data R2 as the search result includes the expected arrival hours for the departure place X3 and the destination place Y2. The running route data R2 may further include the expected passing hours for on-route points, for example, the interchanges IC2, IC3, IC4.

In the next step S109, the server 14, to the user Uc and the driver Db, sends the information about each other and the information of the found running route data R2, and makes inquiries about whether the user Uc and the driver Db agree, similarly to step S105. When the two persons agree, the contract is completed. After the completion of the contract, the vehicle Cb causes the user Uc to get in at the departure place X3, and goes to the destination place Y2, in accordance with the running route data R2.

Thereafter, the vehicles Ca, Cb enter the expressway from the interchanges IC1, IC2 respectively, and travel in the same direction, roughly at the same time. In step S110, the inter-vehicle communication is established. By the inter-vehicle communication, the vehicles C acquire, from each other, information relevant to the running route data, the number of riding users U, the quantity of baggage, the destination place, the number of addable persons, and the quantity of addable baggage. By the inter-vehicle communication, a direct data exchange is performed between the vehicle Ca and the vehicle Cb, so that a quick and simple process is realized.

In step S111, in response to the information, the navigation device 16a of the vehicle Ca or the navigation device 16b of the vehicle Cb performs a route re-search process. Whether the route re-search process is performed by the navigation device 16a of the vehicle Ca or by the navigation device 16b of the vehicle Cb is decided in accordance with an arrangement. By the arrangement, the route re-search process is performed, for example, by a side that receives an inter-vehicle communication electric wave from the partner earlier, a side that has a higher hardware ability, a side that has a lower processing load at that time point, a side that has a longer scheduled running distance, or a side that has a larger number of users U riding. In this determination example, the route re-search process is performed on the side of the vehicle Ca.

On the side that performs the route re-search process, the control unit 20 reads the precondition fitting determination unit 46 (see FIG. 3), and determines whether the vehicle Cb can receive the users Ua, Ub and the quantity of the baggage (the number, size and weight of the baggage) in the vehicle Ca, and whether the vehicle Ca can receive the user Uc and the quantity of the baggage (the number, size and weight of the baggage) in the vehicle Cb. For example, in the case of the transfer from the vehicle Ca to the vehicle Cb, the control unit 20 reads the precondition fitting determination unit 46, and when the number of the users Ua, Ub to transfer from the vehicle Ca and the quantity of the baggage of the users Ua, Ub, which are included in the acquired information, are smaller than the number of addable persons and the quantity of addable baggage in the vehicle Cb, which are included in the acquired information, the control unit 20 determines that the vehicle Ca and the vehicle Cb fit with each other and the receiving is possible. For example, in the case of the transfer from the vehicle Cb to the vehicle Ca, the control unit 20 reads the precondition fitting determination unit 46, and when the number of the user Uc to transfer from the vehicle Cb and the quantity of the baggage of the user Uc, which are included in the acquired information, are larger than the number of addable persons and the quantity of addable baggage in the vehicle Ca, which are included in the acquired information, the control unit 20 determines that the vehicle Ca and the vehicle Cb do not fit with each other and the receiving is impossible. By the determination, a case where it is difficult for the user U to transfer is removed, so that the matching between the vehicle Ca and the vehicle Cb is properly performed. Then, the control unit 20 performs the re-search based on the running route data R1 and the running route data R2, while considering efficient routes for the vehicles Ca, Cb and the users Ua, Ub, Uc individually or comprehensively. The re-search is performed when the control unit 20 reads the route search processing unit 48 (see FIG. 3). In the re-search, the control unit 20 refers to the efficiency condition data 50c, based on the situation at that time. The user U to transfer from the vehicle C, the quantity of the baggage of the user U, and the number of addable persons and the quantity of addable baggage in the vehicle C may be included in the running route data.

In the case of the first running route determination example (see FIG. 7), the control unit 20 determines that it is efficient that the user Ub riding in the vehicle Ca and the user Uc riding in the vehicle Cb share the vehicle in one of the vehicle Ca and the vehicle Cb because the user Ub and the user Uc both go to the destination place Y2. Namely, it is efficient that the vehicle Ca finishes the transport at the time when the vehicle Ca arrives at the first destination place Y1, instead of going to the two destination places Y1, Y2, in terms of running distance and running time, because the vehicle Ca does not need to go to the destination place Y2. The route is efficient also for the user Ub, in terms of time and distance, because the user Ub can go directly to the destination place Y2 of the user Ub, without going through the destination place Y1.

Hence, the control unit 20 reads the transfer place search unit 50a, and searches for the transfer place Z appropriate for the user Ub to transfer from the vehicle Ca to the vehicle Cb, from the map data 32. As described above, a commercial facility or traffic facility that is available at the expected passing hour is appropriate as the transfer place Z, and in this case, the transfer place Z is selected from service areas (SA) or parking areas (PA) in the middle of the expressway. Then, the control unit 20 reads the changed route search unit 50b, corrects the running route data R1 and the running route data R2, and searches for modified running route data R1' in which the vehicle Ca goes through the transfer place Z and modified running route data R2' in which the vehicle Cb goes through the transfer place Z (see FIG. 7).

Moreover, the control unit 20 checks a distance increase and a transfer time about the modified running route data R1' and the modified running route data R2', determines whether the modified running route data R1' and the modified running route data R2' are efficient for the vehicle Ca and the user Ub, and determines whether there is disadvantage for the other vehicle Cb and the other users Ua, Uc. In this case, the control unit 20 determines that there is no great disadvantage for the vehicle Cb and the users Ua, Uc even when the vehicles Ca, Cb go through the transfer place Z. Particularly, in the case of traveling for a somewhat long distance, the driver generally has a rest on-route. Therefore, when the transfer place Z is adopted as one of rest places, the arrival hour is not substantially delayed. Further, on expressways, a stop at a service area (SA) or a parking area (PA) hardly increases the running distance.

In the case where the vehicle Ca and the vehicle Cb transport a plurality of users U in total, the control unit 20 reads the route search processing unit 48, searches for the transfer place such that the efficiency condition is satisfied for each user U, and searches for the modified running route data R1' and the modified running route data R2' such that the efficiency is maximized. In this determination example, the control unit 20 determines that the efficiency is maximized by the modified running route data R1', R2' in which the user Ub transfers at the transfer place Z. In the case where there is no efficient modified running route data R1', R2', the transfer examining process for the user U between the vehicle Ca and the vehicle Cb ends.

When the control unit 20 determines that the efficiency is enhanced as a result of a comprehensive consideration based on the content of the efficiency condition data 50c, the control unit 20 reads the notification processing unit 52, displays the modified running route data R1', R2' on the display 22a, and notifies the driver Da of information relevant to the transfer of the user Ub at the transfer place Z, by a voice-sound output from the speaker 24a. This information is given also to the users Ua, Ub, from the driver Da. Each of the driver Da and the users Ua, Ub agrees to the information relevant to the transfer.

In step S112, the control unit 20 reads the notification processing unit 52, and communicates with the vehicle Cb for the inquiry about the transfer by the inter-vehicle communication, in order to notify the driver Db of the vehicle Cb of the same information. The navigation device 16b of the vehicle Cb notifies the driver Db of the obtained information, by a display output on the display 22a and a voice-sound output from the speaker 24a. This information is given also to the user Uc, from the driver Db. The information includes the modified running route data R1', R2' and data relevant to the transfer place Z, an expected transfer hour for the transfer place Z, the user Ub to transfer, and the quantity of the baggage of the user Ub.

In step S113, in the vehicle Cb having received the notification and the inquiry, whether to receive the transfer is determined based on the displayed information received by the driver Db and the user Uc. In the case of the agreement to the transfer, the contract is completed, and therefore, the information of the contract completion is returned to the vehicle Ca. When the contract is completed, the user Ub notifies the driver Db of the contact address of the user Ub, and the driver Db notifies the user Ub of the contact address of the driver Db. The notice of the information is given also to the server 14. The server 14, after receiving the notice, sends a confirmation notice to the vehicles Ca, Cb in step S114. In the case where one of the drivers Da, Db and the users Ua, Ub, Uc refuses the transfer or refuses to go through the transfer place, another matching or another route is searched for again. Alternatively, this share-ride request is regarded as being not completed, and a notice of the incompletion is given to each of the drivers Da, Db and the users Ua, Ub, Uc.

In step S115, in the route information rewriting unit 56 of the vehicle Ca, the modified running route data R1' is set in place of the original running route data R1, and is stored as the route information 34. Similarly, in step S116, in the route information rewriting unit 56 of the vehicle Cb, the modified running route data R2' is set in place of the original running route data R2, and is stored as the route information 34. Then, the vehicles Ca, Cb go to the transfer place Z in accordance with the modified running route data R1', R2'. The control unit 20 reads the route guide unit 42, so that the vehicles Ca, Cb are explicitly guided to the transfer place Z. At this time, the vehicles C mutually confirm the positions of the vehicles C by the inter-vehicle communication. It is possible to mutually confirm the positions, by displaying the position of the transfer vehicle C' on the display 22a in addition to the own vehicle C.

In step S117, when the vehicles Ca, Cb arrive at the transfer place Z, The control unit 20 reads the route guide unit 42, and informs the drivers Da, Db of the arrival. At this time, by reading the route guide unit 42, the control unit 20 may individually announce the arrival of the own vehicle C at the transfer place Z and the arrival of the transfer vehicle C' at the transfer place Z. The control unit 20 reads the route guide unit 42, and prompts the user Ub to transfer. Then, the user Ub transfers from the vehicle Ca to the vehicle Cb with the own baggage. For the transfer of the user Ub, the vehicle Ca and the vehicle Cb do not need to be at the transfer place Z at the same time. If the user Ub agrees, the vehicle Ca may start after the user Ub gets out at the transfer place Z, without waiting for the arrival of the vehicle Cb. Since a commercial facility or traffic facility is selected as the transfer place Z, the user Ub, for example, can hope to have a meal or perform shopping, and in that case, an expected wait time for the user Ub may be set to a somewhat long time. Information about the fact of the transfer is recorded in both navigation devices 16, and is given also to the server 14.

Then, the vehicle Ca restarts with the user Ua, goes through the interchange IC3, and arrives at the destination place Y1 in step S118. Since the user Ub is not in the vehicle Ca, the vehicle Ca does not need to go to the farther destination place Y2.

On the other hand, the vehicle Cb restarts with the users Ub, Uc, passes through the interchange IC3, further goes through the interchange IC4, and arrives at the destination place Y2 in step S119. The user Ub can go directly to the destination place Y2, without going through the destination place Y1 included in the initially scheduled running route data R1 and without exiting the expressway at the interchange IC3.

After the arrival at the destination places Y1, Y2, the vehicles Ca, Cb report the finish of the transport of the user U, to the server 14. In response to the finish report, the server 14 performs a necessary post-process in step S120. Examples of the post-process include a record of a traveling log, an acceptance of the evaluation of the driver D from the user U, an acceptance of the evaluation of the user U from the driver D, and an expensing process.

Second Running Route Determination Example

Next, a second running route determination example will be described with reference to FIG. 9 and FIG. 10.

Figure 9:
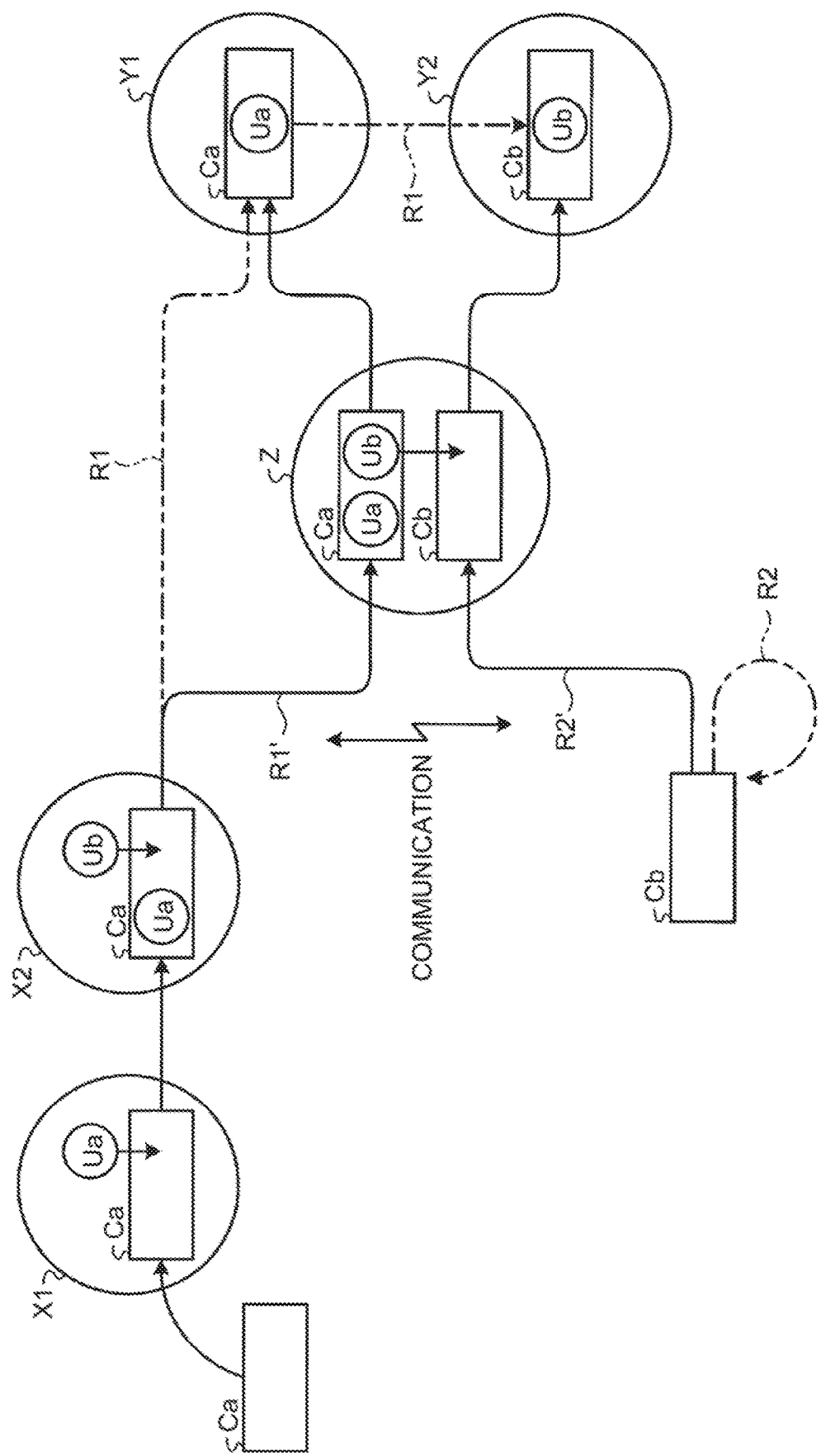
FIG. 9 is a schematic diagram showing vehicles, users, departure places, a transfer place and destination places in a second running route determination example.

As shown in FIG. 9, in the second running route determination example, similarly to the first running route determination example, the user Ua goes from the departure place X1 to the destination place Y1, and the user Ub goes from the departure place X2 to the destination place Y2. The vehicle Ca is close to the departure place X1. The vehicle Cb has no user U that is scheduled to ride, and for example, performs merely driving or waits somewhere. In this case, the information that the vehicle Cb is in a free traveling state is given to the server 14, as the running route data R2 for the vehicle Cb, and is recorded in the vehicle situation grasp unit 78 (see FIG. 4). In FIG. 9, a round arrow shows the running route data R2 relevant to the free traveling state of the vehicle Cb.

Figure 10:
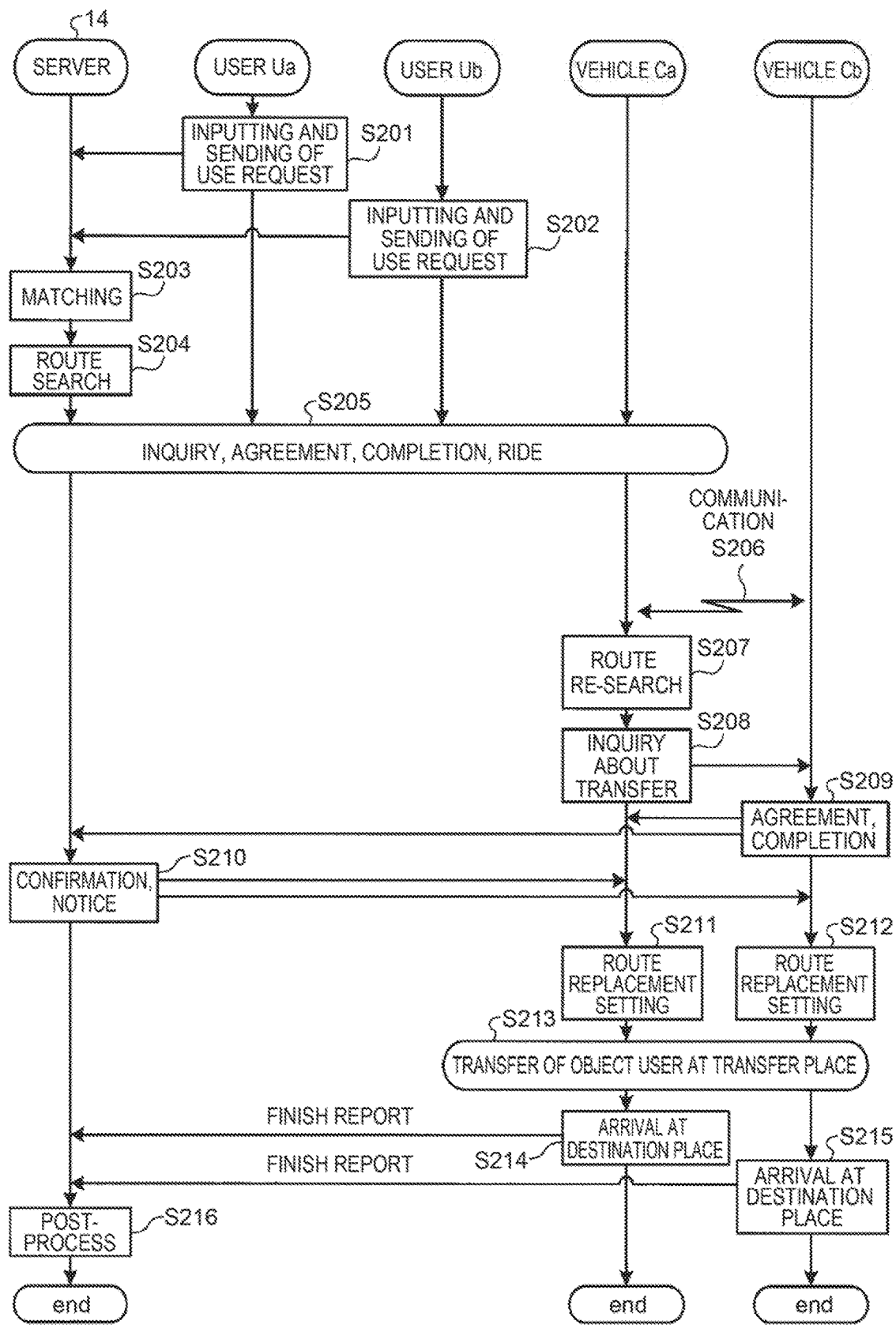
FIG. 10 is a flowchart in the second running route determination example.

Step S201 to step S205 in FIG. 10 are the same as step S101 to S105 described above. In step S206, the inter-vehicle communication is established between the vehicle Ca and the vehicle Cb.

In step S207, the navigation device 16a or the navigation device 16b, after receiving the information, performs the route re-search process. On the side that performs the route re-search process, the navigation device performs the re-search based on the running route data R1 and the running route data R2, while considering efficient routes for the respective vehicles C and the respective users U individually or comprehensively based on the efficiency condition data 50c.

Further, at this time, there is substantially no route along which the vehicle Cb is scheduled to travel, and therefore, the route does not need to be considered or the weighting for the consideration may be small. Particularly, in the case where the driver Db of the vehicle Cb likes to drive or welcomes a passenger, if that information about the driver Db is registered in the driver database 70, the vehicle Ca may acquire that information from the server 14 and may preferentially perform the matching, or the vehicle Cb may be set so as to initiatively make an inquiry for the transfer acceptance to the vehicle Ca.

Step S208 to step S216 after that are the same as step S112 to step S120 described above. However, the process of setting the modified running route data R2' in place of the original running route data R2 in step S212 is substantially the same as a process of newly setting the modified running route data R2'.

In the second running route determination example, similarly to the first running route determination example, the vehicle Ca does not go to both of the two destination places Y1, Y2, and finishes the transport at the time when the vehicle Ca arrives at the first destination place Y1. Therefore, the vehicle Ca does not need to go to the destination place Y2, and the route is efficient in terms of running distance and running time. The route is efficient also for the user Ub, in terms of time, because the user Ub can go directly to the destination place Y2 of the user Ub, without going through the destination place Y1. Furthermore, the driver Db of the vehicle Cb obtains a passenger, and finds a purpose of driving, resulting in a productive driving.

Third Running Route Determination Example

Next, a third running route determination example will be described with reference to FIG. 11 and FIG. 12.

Figure 11:
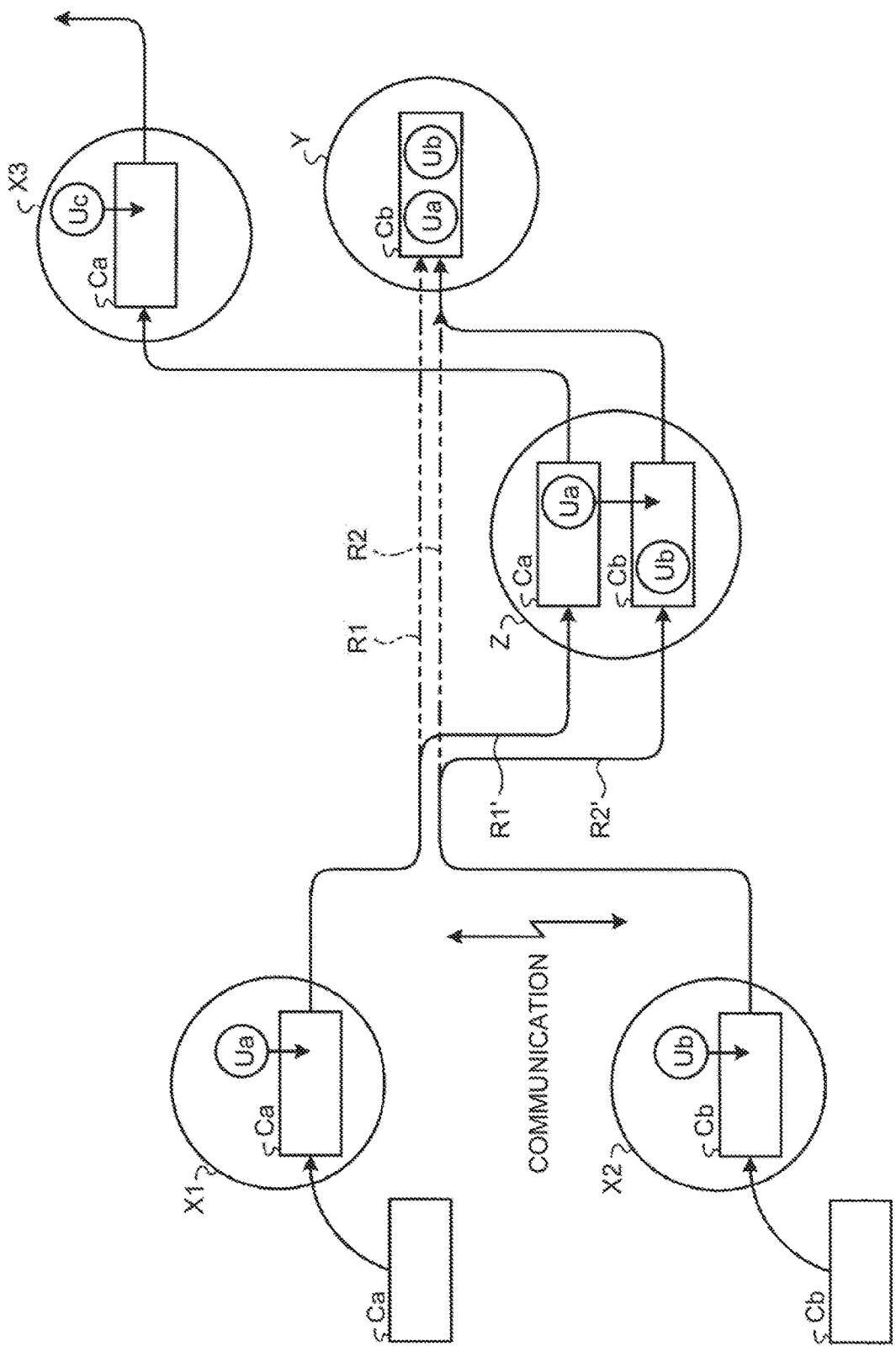
FIG. 11 is a schematic diagram showing vehicles, users, departure places, a transfer place and a destination place in a third running route determination example.

As shown in FIG. 11, in the third running route determination example, the user Ua goes from the departure place X1 to a destination place Y, and the user Ub goes from the departure place X2 to the destination place Y. The vehicle Ca is close to the departure place X1, and the vehicle Cb is close to the departure place X2. In this case, the departure place X1 and the departure place X2 may be away from each other, but directions from the destination place Y to the departure places X1, X2 are roughly the same as each other.

Figure 12:
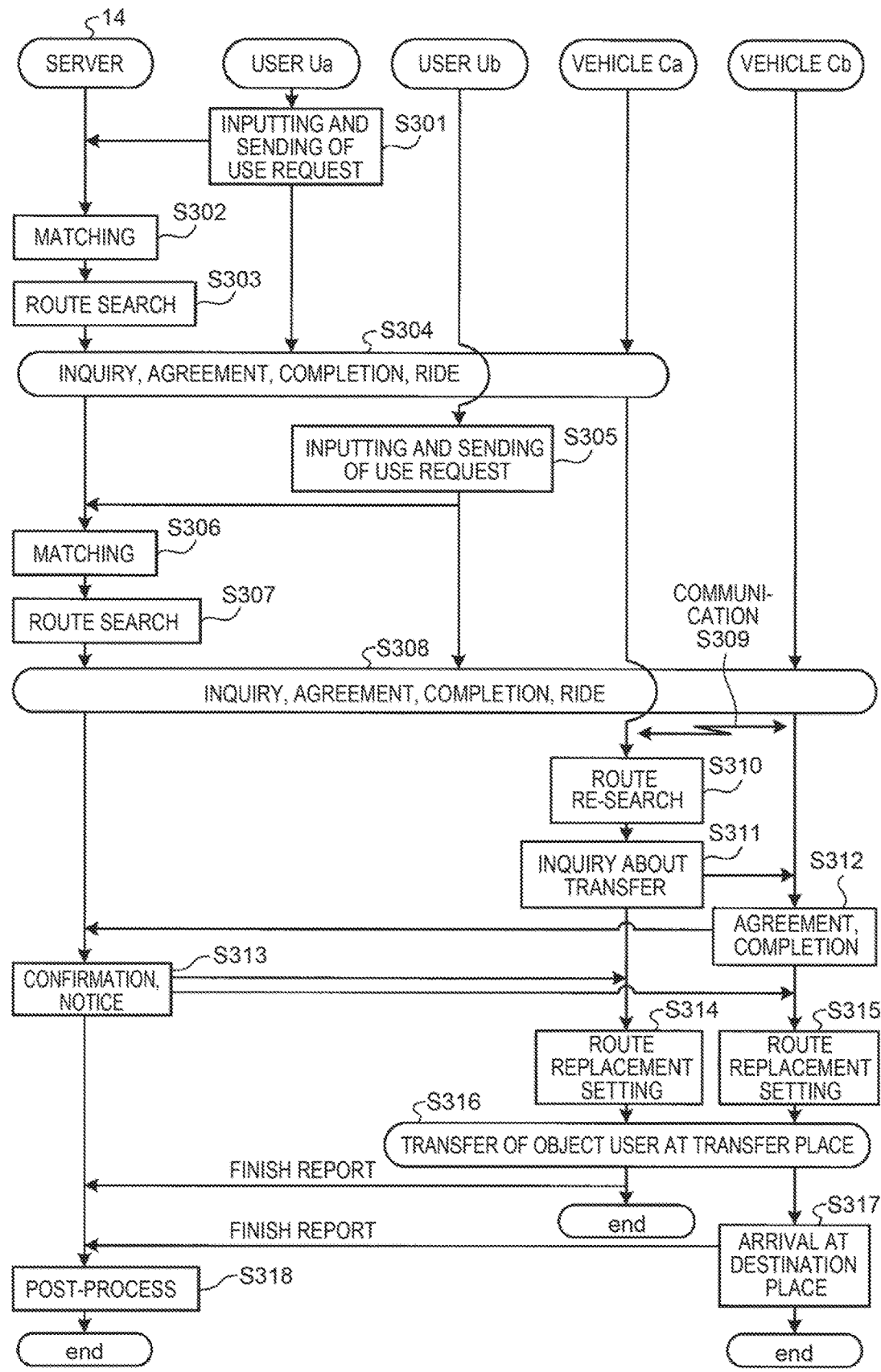
FIG. 12 is a flowchart in the third running route determination example.

Step S301 in FIG. 12 is the same as step S101 described above. In step S302, the server 14 performs the matching between the user Ua and the vehicle C. In this case, the server 14 determines that it is efficient that the user Ua is transported by the vehicle Ca close to the departure place X1. Furthermore, in step S303, the server 14 searches for the running route data R1 with which the vehicle Ca transports the user Ua from the departure place X1 to the destination place Y. The running route data R1 is set such that the vehicle Ca first goes to the departure place X1, causes the user Ua to get in, and goes to the destination place Y. Then, in step S304, the server 14 notifies the user Ua of the information of the running route data R1 and the information about the vehicle Ca, and notifies the vehicle Ca of the information of the running route data R1 and the information about the user Ua. The server 14 makes inquiries about whether the user Ua and the driver Da agree. When both the user Ua and the driver Da agree, the contract is completed. After the completion of the contract, the vehicle Ca causes the user Ua to get in at the departure place X1, and goes to the destination place Y, in accordance with the running route data R1.

Meanwhile, in step S305, the user Ub performs the use request to the server 14. In step S306 to step S308, similarly to step S302 to step S304, the server 14 performs the matching between the vehicle Cb and the user Ub, searches for the running route data R2 for going from the departure place X2 to the destination place Y, makes inquiries to the two, obtains the agreement, and completes the contract. Then, the vehicle Cb causes the user Ub to get in at the departure place X2, and goes to the destination place Y, in accordance with the running route data R2. Here, a latter half part of the running route data R2 for the vehicle Cb roughly coincides with a latter half part of the running route data R1 for the vehicle Ca.

In step S309, the inter-vehicle communication is performed between the vehicle Ca and the vehicle Cb, which go in the same direction, and information exchange is performed similarly to step S110 described above.

In step S310, the navigation device 16a or the navigation device 16b, after receiving the information, performs the re-search based on the running route data R1 and the running route data R2, while considering efficient routes for the respective vehicles C and the respective users U individually or comprehensively based on the efficiency condition data 50c.

In the case of the third running route determination example (see FIG. 11), the user Ua riding in the vehicle Ca and the user Ub riding in the vehicle Cb both go to the destination place Y, and further, the latter half part of the running route data R2 roughly coincides with the latter half part of the running route data R1. Therefore, the server 14 determines that it is efficient that the user Ua and the user Ub share the vehicle in one of the vehicles C.

Hence, the control unit 20 reads the transfer place search unit 50a, and searches for the transfer place Z appropriate for the user Ua to transfer to the vehicle Ca or the vehicle Cb or appropriate for the user Ub to transfer to the vehicle Ca or the vehicle Cb, from the map data 32. This process is included also in the process in step S111 described above. The control unit 20 reads the changed route search unit 50b, and determines which of the transfer of the user Ua from the vehicle Ca to the vehicle Cb and the transfer of the user Ub from the vehicle Cb to the vehicle Ca is appropriate. The control unit 20 performs this determination while referring to the efficiency condition data 50c. For example, in the case where it is assumed that the vehicle Ca returns to a place close to the departure place X1 after the transport of the user Ua and further where the departure place X1 is somewhat far from the destination place Y, the control unit 20 determines that it is efficient that the vehicle Ca finishes the transport of the user Ua at the transfer place Z and the vehicle Cb goes to the destination place Y in consideration of the distance and time for returning.

Then, the control unit 20 reads the changed route search unit 50b, searches for the modified running route data R1' resulting from changing the running route data R1 for the vehicle Ca such that the vehicle Ca finishes the transport at the transfer place Z, and searches for the modified running route data R2' resulting from modifying the running route data R2 for the vehicle Cb such that the vehicle Cb goes to the destination place Y through the transfer place Z. In the modified running route data R1', the vehicle Ca finishes the transport at the transfer place Z, but in a broad sense, it can be said that the vehicle Ca goes through the transfer place Z.

Step S311 to step S316 are the same as step S112 to step S117 described above. However, since the vehicle Ca finishes the share ride after the transfer of the user Ua in step S316, the vehicle Ca reports the finish to the server 14 at the time point. Since the vehicle Ca becomes free, the vehicle Ca, for example, may cause another user Uc to share the vehicle from a close departure place X3. On the other hand, the vehicle Cb goes to the destination place Y with the users Ua, Ub, in accordance with the modified running route data R2'. In step S317, the vehicle Cb arrives and reports the finish. In step S318, the server 14 performs the post-process.

The third running route determination example can shorten the running distance and the running time for the vehicle Ca, hardly increase the running distance and the running time for the vehicle Cb, and is efficient from a comprehensive standpoint. It is easily understood that the third running route determination example can be similarly applied in the case where the vehicle Ca initially goes to the destination place Y and goes to a different destination place for some reason (for example, in the case where the vehicle Ca goes to the departure place X3 for coping with the use request from the user Uc). Further, the destination place of the vehicle Ca may be changed based on the convenience or determination of the driver Da, or may be changed based on an instruction from server 14.

In the above first to third running route determination examples, the departure place X and destination place Y of the vehicle C is set based on the use request from the user U, and there is a high convenience for the user U.

In the above first to third running route determination examples, by the navigation device 16a of the vehicle Ca or the navigation device 16b of the vehicle Cb, the initial running route data R1, R2 is searched for and changed such that the vehicle C goes through the transfer place Z. However, this process may be performed by the changed route search unit 80c of the server 14. In this case, the server 14 may perform the matching between the vehicle C and the user U, the search for the transfer place Z, and the search for the modified running route data R' in which the vehicle C goes through the transfer place Z, at the time when the server 14 receives the use request from the user U, and then may make inquiries about the agreement to the respective vehicles C and the respective users U. That is, the control unit 60 may grasp the situations of three or more vehicles by reading the vehicle situation grasp unit 78, and may select the vehicle Ca and the vehicle Cb from the vehicles C grasped when the control unit 60 reads the vehicle situation grasp unit 78, based on the departure place X and destination place Y of the user U acquired when the control unit 60 reads the matching unit 76.

Specifically, the control unit 60 refers to the running route data R1, R2 periodically acquired from the vehicles Ca, Cb and stored in the vehicle situation grasp unit 78. Further, the control unit 60 reads the route search processing unit 80 to execute the process, and thereby searches for the modified running route data R1', R2' resulting from modifying the running route data R1, R2 such that the transfer place Z is included. Then, the control unit 60 reads the acceptance-inquiry unit 74, and notifies each of the drivers Da, Db of the modified running route data R1', R2' and other information, by the output of the display 22a and speaker 26a of each vehicle C. The procedure of the agreement and ride after that has been described above.

Fourth Running Route Determination Example

Next, a fourth running route determination example will be described with reference to FIG. 13 and FIG. 14.

Figure 13:
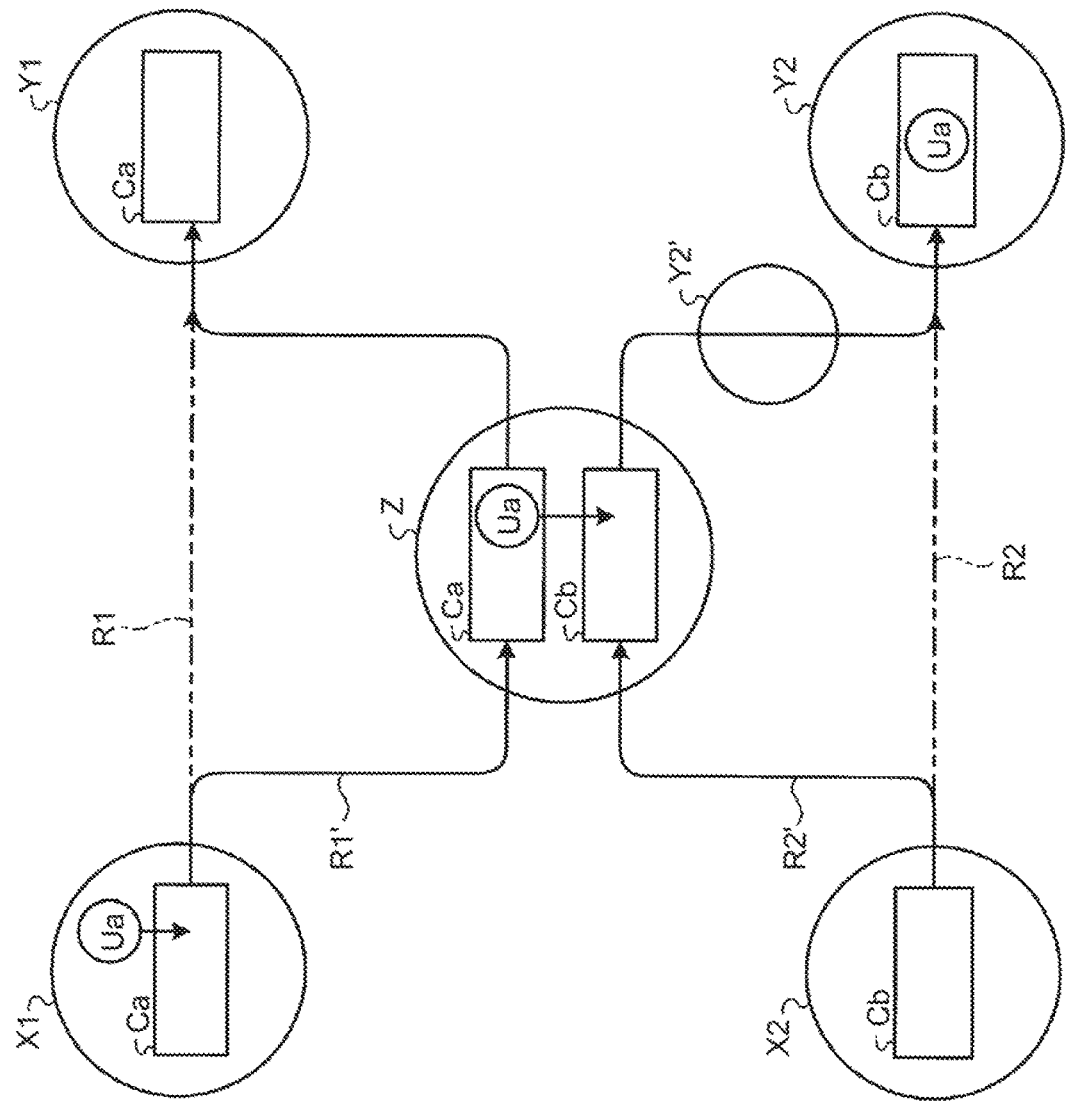
FIG. 13 is a schematic diagram showing vehicles, a user, departure places, a transfer place and destination places in a fourth running route determination example.

As shown in FIG. 13, in the fourth running route determination example, the vehicle Ca goes from the departure place X1 to the destination place Y1, the vehicle Cb goes from the departure place X2 to the destination place Y2, and the user Ua goes from the departure place X1 to the destination place Y2. In the running route data R1 in which the vehicle Ca goes from the departure place X1 to the destination place Y1 and the running route data R2 in which the vehicle Cb goes from the departure place X2 to the destination place Y2, the vehicle Ca and the vehicle Cb, on-route, go through places close to each other.

Figure 14:
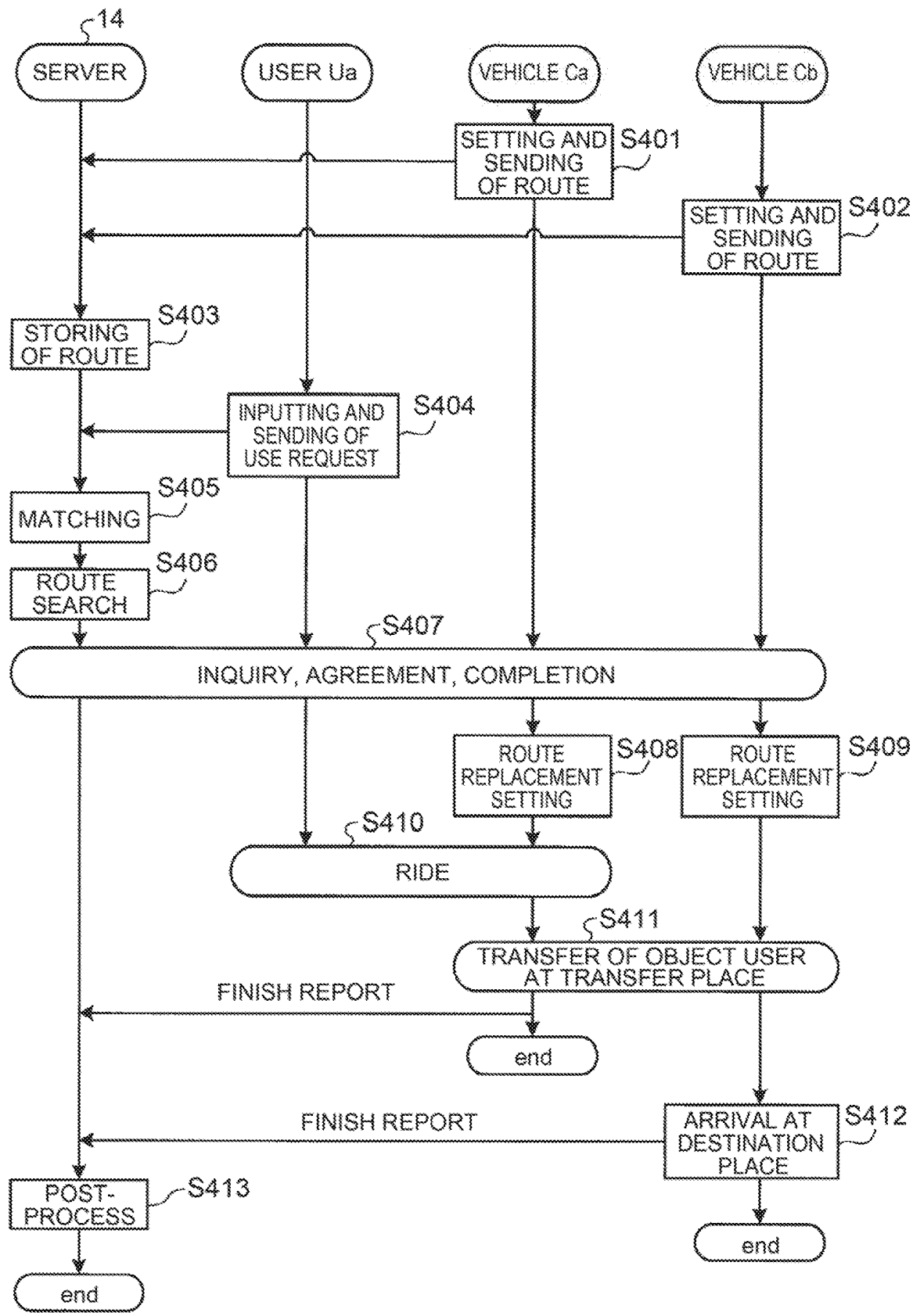
FIG. 14 is a flowchart in the fourth running route determination example.

In step S401 in FIG. 14, the vehicle Ca searches for and sets the running route data R1 in which the vehicle Ca goes from the departure place X1 to the destination place Y1, and sends the running route data R1 to the server 14, together with the scheduled date and hour. Similarly, in step S402, the vehicle Cb searches for and sets the running route data R2 in which the vehicle Cb goes from the departure place X2 to the destination place Y2, and sends the running route data R2 to the server 14, together with the scheduled date and hour. A plurality of running schedules for the vehicle C may be previously sent. Further, for example, a periodical weekly running schedule may be sent. In step S403, the server 14 stores the received information in the vehicle situation grasp unit 78.

In step S404, the user Ua performs a process of inputting and sending a use request about a hope to go from the departure place X1 to the destination place Y2. The order of steps S401, S402 that are sending processes by the vehicles C and step S404 that is a sending process by the user U may be reversed, and the use request information from one or more users U may be previously stored in the server 14.

In step S405, the control unit 60 reads the matching unit 76, and performs the matching between the user U and the vehicle C. In this case, each of the running route data R1 and the running route data R2 is the same as one of the departure place X1 and destination place Y2 of the user Ua, but is different from the other of the departure place X1 and destination place Y2 of the user Ua. Therefore, the control unit 20 determines that the user Ua cannot be transported by one of the vehicle Ca and the vehicle Cb.

Then, the control unit 60 reads the matching unit 76, and checks whether there is a combination of two or more vehicles C that can transport the user Ua by causing the user Ua to transfer on-route. The user Ua and the vehicle Ca depart from the same departure place X1, and the user Ua and the vehicle Cb go to the same destination place Y2. Furthermore, the running route data R1 and the running route data R2 show that the vehicle Ca and the vehicle Cb, on-route, go through places close to each other. In response to this, the control unit 60 reads the transfer place search unit 50a, and searches for an appropriate transfer place Z near the close places in the running route data R1 and the running route data R2.

In step S406, the control unit 20 reads the changed route search unit 50b, performs the route search for the running route data R1 and the running route data R2, such that the vehicle Ca and the vehicle Cb go through the transfer place Z, and obtains the modified running route data R1' (see FIG. 13) and modified running route data R2'.

Moreover, the control unit 20 checks a distance increase and a transfer time about the modified running route data R1' and the modified running route data R2', and determines whether the modified running route data R1' and the modified running route data R2' are efficient for the vehicles Ca, Cb and the user Ua. The determination is performed based on the efficiency condition data 50c. Next, in step S407, the server 14 sends the information of the modified running route data R1' and the modified running route data R2' and the information about the user Ua, to the vehicle Ca and the vehicle Cb, and sends the information of the modified running route data R1' and the modified running route data R2' and the information about the vehicles Ca, Cb, to the user Ua. Then, the server 14 makes inquiries about the agreement. The three persons are explicitly informed of the transfer of the user Ua at the transfer place Z, particularly. When the three persons agree, the contract is completed, and the server 14 returns the information of the contract completion, to the three persons. This process is the same as step S105 described above.

In step S408, the vehicle Ca sets the modified running route data R1' in place of the running route data R1, and in step S409, the vehicle Cb sets the modified running route data R2' in place of the running route data R2. In step S410, at a scheduled departure hour of the vehicle Ca, the vehicle Ca causes the user Ua to get in at the departure place X1, and departs in accordance with the modified running route data R1'. On the other hand, at a scheduled departure hour of the vehicle Cb, the vehicle Cb departs from the departure place X2 in accordance with the modified running route data R2'.

In step S411, the vehicle Ca and the vehicle Cb each arrive at the transfer place Z, and the user Ua transfers to the vehicle Cb. Since the vehicle Ca finishes the transport of the user Ua, the vehicle Ca sends the finish report to the server 14. The vehicle Cb departs from the transfer place Z, and further travels in accordance with the modified running route data R2'. Thereafter, in step S412, the vehicle Cb arrives at the destination place Y2. Then, the vehicle Cb causes the user Ua to get out, and sends the finish report to the server 14. In step S413, the server 14 performs the post-process.

In the fourth running route determination example, even when the user Ua cannot go to the destination place Y2 while riding in one vehicle C, the control unit 60 reads the vehicle situation grasp unit 78, and selects two or more vehicles C from three or more vehicles. The user Ua can go to the destination place Y2, by making a connection between these vehicles C, so that share rides to a variety of places are realized. The destination place of the user Ua may be an on-route place Y2' between the transfer place Z and the destination place Y2.

The fourth running route determination example is advantageous, because the driver D only needs to drive roughly in accordance with the running route data R including the initial schedule of the driver D.

As described above, in each running route determination example, the server 14 or the navigation device 16 reads the program 30 or the program 66 to execute the process, and thereby, searches for the transfer place Z where the user U transported by at least one of the vehicle Ca and the vehicle Cb transfers to the other of the vehicle Ca and the vehicle Cb, such that the efficiency condition in the efficiency condition data 50c, 80d is satisfied, while comparing the running route data R1 for the vehicle Ca and the running route data R2 for the vehicle Cb. Then, the server 14 or the navigation device 16 searches for the modified running route data R1' resulting from modifying the running route data R1 such that the vehicle Ca goes through the transfer place Z (including a case where the transfer place Z is an end point) and the modified running route data R2' resulting from modifying the running route data R2 such that the vehicle Cb goes through the transfer place Z, and outputs the modified running route data R1' and the modified running route data R2' from the display 22a and speaker 24a of each of the vehicle Ca and the vehicle Cb. After receiving the notices of the modified running route data R1' and the modified running route data R2', the drivers Da, Db determine that the modified running route data R1' and the modified running route data R2' are suitable, and thereafter, the user U can transfer at the transfer place Z. Thereby, the on-route transfer of the user U is realized, and the user can be efficiently transported.

The above running route determination examples can adopt many variations. For example, one user U may transfer at two or more transfer places Z, and may share the vehicle in three or more vehicles C. One vehicle C may cause different users U to transfer at two or more on-route transfer places Z in the modified running route data R'. At one transfer place Z, two or more users U may transfer among three or more vehicles C. The departure place X where the user U gets in the vehicle C and the destination place Y where the user U gets out of the vehicle C may be adjusted to some extent between the user U and the driver D.

Some or most of the processes to be performed by the navigation device 16 may be performed, instead, by the server 14. The running route determination may be performed by the navigation device 16 and the server 14 in cooperation. The data (for example, the map data 32, 68) in the navigation device 16 and the server 14 may be shared or mutually complemented.

In the above running route determination examples, the vehicle C transports the user U. However, even when the vehicle C transports a parcel (transport object) instead of the user U, the disclosure can be applied similarly, and the same effects are obtained. Both the user U and the parcel may be transported as the transport object. The driving subject of the vehicle C is not limited to the driver D, and may be an automatic driving device (including a semi-automatic driving device). In this case, the automatic driving device may be integrated with the navigation device 16. The distance between the departure place X and the destination place Y may be a long distance or may be a short distance. The share-ride support system 10 is variously used, and for example, can be suitably used by the driver D and the user U that go to a place where many people gather, as exemplified by a sporting event place, a music event place, a cultural event place, an airport, a major station and a disaster area.

The computer may be constituted by processors (not illustrated) such as a central processing unit (CPU) and a digital signal processor (DSP), a main storage unit (not illustrated) such as a random access memory (RAM) and a read only memory (ROM), and an auxiliary storage unit (not illustrated) such as an erasable programmable read only memory (EPROM), a hard disk drive, a removable medium. An operating system (OS), various programs, various tables and the like may be stored in the auxiliary storage unit, and the stored program may be loaded and executed on a working region of the main storage unit. By the execution of the program, each component unit of the computer may be controlled, and thereby a function according to a predetermined purpose may be realized.

A program that causes a computer to realize functions of management and control of the whole of the navigation device 16 or the server 14 in the embodiment may be recorded in a computer-readable recording medium. Since the computer reads and executes the program in the recording medium, the computer functions as the navigation device 16 or the server 14. The computer-readable recording medium is a non-transitory recording medium that accumulates information such as data and programs by an electric, magnetic, optical, mechanical or chemical action, and that can be read from a computer or the like. Among such recording media, examples of recording media that can be detached from the computer include a flexible disk, a magneto-optical disk, a CD-ROM, a CD-R/W, a DVD, a Blu-ray disk, a digital audio tape (DAT), an 8-mm tape, and a memory card such as a flash memory. Further, examples of recording media that are fixed in the computer or the like include a hard disk and a read only memory (ROM). Furthermore, a solid state drive (SSD) can be used both as the recording medium that can be detached from the computer and as the recording medium that is fixed in the computer. The navigation device 16 and the server 14 in the above embodiment are examples of the computer, and the storage unit 28 and the storage unit 64 in the above embodiment are examples of the storage medium.

Naturally, the disclosure is not limited to the above embodiment, and can be freely modified without departing from the spirit of the disclosure. Further, when the disclosure is carried out, it is natural that the disclosure carried out in the scope of the law of the country or region and can be modified in accordance with the law.

What is claimed is:

1. A running route determination device comprising:
a memory; and
a hardware processor configured to
acquire first running route data for a first vehicle and second running route data for a second vehicle, the first running route data including a first weight capacity, the second running route data including a second weight capacity, and
in response to a weight of at least one transport object transported by the first vehicle being less than the second weight capacity,
search for a transfer place such that an efficiency condition is satisfied, while comparing the first running route data and the second running route data, the transfer place being a place where the at least one transport object is to be transferred to the second vehicle,
search for and output first modified running route data and second modified running route data, the first modified running route data being data resulting from modifying the first running route data such that the first vehicle will go through the transfer place, the second modified running route data being data resulting from modifying the second running route data such that the second vehicle will go through the transfer place, and
store the first modified running route data and the second modified running route data in the memory.

2. The running route determination device according to claim 1, wherein the efficiency condition is a condition that at least one of a running time and a running distance of the first vehicle is shortened.

3. The running route determination device according to claim 1, wherein the efficiency condition is a condition that at least one of a time to arrival of the at least one transport object at a destination place and a distance to the destination place is shortened.

4. The running route determination device according to claim 1, wherein the hardware processor is configured to select the transfer place from commercial facilities or traffic facilities that are available at expected arrival hours of the first vehicle and the second vehicle.

5. The running route determination device according to claim 1, wherein the hardware processer is further configured to
grasp each situation of three or more vehicles including the first vehicle and the second vehicle, from information that is received through a communication network; and
select the first vehicle and the second vehicle from the three or more vehicles, based on a departure place and a destination place of the at least one transport object.

6. The running route determination device according to claim 1, wherein
the hardware processor is configured to, when the first vehicle and the second vehicle transport a plurality of transport objects including the at least one transport object,
search for the transfer place such that the efficiency condition is satisfied for each of the plurality of transport objects, and search for the first modified running route data and the second modified running route data such that efficiency is maximized.

7. The running route determination device according to claim 1, wherein a departure place and a destination place are set based on the at least one transport object in the first running route data.

8. The running route determination device according to claim 1, wherein a departure place and a destination place are set by a first driving subject in the first running route data.

9. The running route determination device according to claim 1, wherein a departure place and a destination place are set by a second driving subject in the second running route data.

10. The running route determination device according to claim 1, wherein:
the second vehicle is configured to send the second running route data to the first vehicle by inter-vehicle communication;
the hardware processor is included in the first vehicle; and
the hardware processor is configured to
search for the first modified running route data and the second modified running route data, and
send the second modified running route data to the second vehicle by the inter-vehicle communication.

11. The running route determination device according to claim 1, wherein:
the first vehicle is configured to send the first running route data to the second vehicle by inter-vehicle communication;
the hardware processor is included in the second vehicle; and
the hardware processor is configured to
search for the first modified running route data and the second modified running route data, and
send the first modified running route data to the first vehicle by the inter-vehicle communication.

12. A non-transitory storage medium in which a program is stored, when the program is executed by a computer including a hardware processor, the program causing the computer to execute operation comprising:
acquiring, using the hardware processor, first running route data for a first vehicle and second running route data for a second vehicle, the first running route data including a first weight capacity, the second running route data including a second weight capacity;
in response to a weight of at least one transport object transported by the first vehicle being less than the second weight capacity,
searching, using the hardware processor, for a transfer place such that an efficiency condition is satisfied, while comparing the first running route data and the second running route data, the transfer place being a place where the at least one transport object is to be transferred to the second vehicle,
searching for and outputting, using the hardware processor, first modified running route data and second modified running route data, the first modified running route data being data resulting from modifying the first running route data such that the first vehicle will go through the transfer place, the second modified running route data being data resulting from modifying the second running route data such that the second vehicle will go through the transfer place, and
storing, using the hardware processor, the first modified running route data and the second modified running route data in a memory.

13. A running route determination method comprising:
acquiring, using a hardware processor, first running route data for a first vehicle and second running route data for a second vehicle, the first running route data including a first weight capacity, the second running route data including a second weight capacity;
in response to a weight of at least one transport object transported by the first vehicle being less than the second weight capacity,
searching, using the hardware processor, for a transfer place such that an efficiency condition read from a storage unit is satisfied, while comparing the first running route data and the second running route data, the transfer place being a place where the at least one transport object is to be transferred to the second vehicle,
searching for and outputting, using the hardware processor, first modified running route data and second modified running route data, the first modified running route data being data resulting from modifying the first running route data such that the first vehicle will go through the transfer place, the second modified running route data being data resulting from modifying the second running route data such that the second vehicle will go through the transfer place, and
storing, using the hardware processor, the first modified running route data and the second modified running route data in a memory.

* * * * *